United States Patent [19]
Poulin

[11] Patent Number: 5,647,707
[45] Date of Patent: Jul. 15, 1997

[54] MULTIPLE-AXIS MACHINING APPARATUS

[75] Inventor: Jean-Paul Poulin, Schenectady, N.Y.

[73] Assignee: Positive Position Inc., Schenectady, N.Y.

[21] Appl. No.: 359,273

[22] Filed: Dec. 19, 1994

[51] Int. Cl.⁶ .................................. B23C 1/12; B27F 5/00
[52] U.S. Cl. .................. 409/189; 144/134 A; 144/135.2; 409/164; 409/205; 409/225
[58] Field of Search .................................. 409/107, 109, 409/228, 164, 224, 170, 192, 197, 189, 191, 158, 163, 205; 144/134 A, 253 J

[56] References Cited

U.S. PATENT DOCUMENTS

| | | | |
|---|---|---|---|
| 2,075,008 | 3/1937 | Damm et al. | 90/58 |
| 2,085,235 | 6/1937 | Tautz | 144/253 J |
| 2,752,961 | 7/1956 | Melgaard | 144/136 |
| 2,829,564 | 4/1958 | Onsrud | 409/107 |
| 3,203,314 | 8/1965 | Ried | 90/11 |
| 3,742,816 | 7/1973 | Carnahan | 409/109 |
| 4,281,694 | 8/1981 | Gorman | 144/134 |
| 4,439,952 | 4/1984 | Roberts et al. | 144/134 A |
| 4,512,380 | 4/1985 | Schmidt | 144/1 A |
| 4,679,606 | 7/1987 | Bassett | 144/134 A |
| 4,798,113 | 1/1989 | Viazanko | 83/471.3 |
| 4,817,693 | 4/1989 | Schuler | 144/359 |
| 4,830,554 | 5/1989 | Lopez | 409/164 |
| 4,940,067 | 7/1990 | Beard | 409/224 X |
| 5,063,983 | 11/1991 | Barry | 144/371 |
| 5,139,065 | 8/1992 | Stark | 144/371 |
| 5,191,935 | 3/1993 | McCombie | 144/286 |
| 5,203,389 | 4/1993 | Goodwin | 144/356 |
| 5,219,011 | 6/1993 | Speck | 144/136 |
| 5,271,441 | 12/1993 | Gakhar et al. | 144/134 A |
| 5,284,407 | 2/1994 | Wanrzyniak | 409/170 X |
| 5,299,609 | 4/1994 | Wedler | 144/1 |

FOREIGN PATENT DOCUMENTS

| | | | |
|---|---|---|---|
| 1921879 | 11/1969 | Germany | 144/134 A |
| 2519350 | 11/1975 | Germany | 144/134 A |

*Primary Examiner*—William R. Briggs
*Attorney, Agent, or Firm*—Heslin & Rothenberg, P.C.

[57] ABSTRACT

A multi-axis machining apparatus including structure for positioning a workpiece in a precise and repeatable manner in relation to a tool bit. The multi-axis machining apparatus includes a first table forming a horizontally disposed upper surface and having an opening for mounting a first tool in an inverted position therein and for projecting a first bit upward through the opening and above said upper surface. The horizontal upper surface has first and second axes intersecting each other in perpendicular relationship and the opening is centered on a vertical third axis, intersecting said first and second axes in perpendicular relationship therewith. A fence structure may be attached to the carriage assembly for guiding movements of a workpiece along the upper surface of the first table. A second table assembly is attachable to the underside of the first table. A carriage assembly may be operatively engaged with the first table for moving the carriage assembly in a direction parallel to the second axis. The carriage assembly may include a carriage slidably engaged therein. A second tool having a second bit oriented in a downward position parallel to the third axis may be mounted to the carriage.

36 Claims, 16 Drawing Sheets

MULTIPLE-AXIS MACHINING APPARATUS

BACKGROUND OF THE INVENTION

1. Technical Field

The present invention generally relates to machine tools. More particularly, the present invention relates to machine tools such as routers. Even more particularly, the present invention relates to versatile router machining devices and operations.

2. Background Information

Routers are commonly known and popular tools used for cutting precise edges and groves in workpieces. Virtually any type of joint can be cut partially or completely with a router. For example, routers may be employed for straight-line dadoing, edge-forming, rabbeting, jointing, smoothing edges, mortising, tenoning, grooving, slotting, spline cutting, and shaping irregular edges. Furthermore, router devices may be used to effect virtually an endless array of decorative cuts.

While there are numerous routing devices known in the art—many of which include precision guides and advancing mechanisms—for effecting highly precise cuts or grooves to be made in a workpiece, difficulties become apparent when one is faced with making a plurality of identical cuts or grooves precisely spaced relative to each other, in one or more workpieces. In order to achieve the identical cuts or grooves, it is usually necessary to adjust the position of the workpiece or position an additional workpiece in relation to the router bit in an exact and precise manner. However, adjusting the position of a workpiece relative to the cutting tool is a continuing problem, particularly in custom woodworking where high precision calibrated readjustment is often required. Therefore, a significant problem associated with conventional router machining devices and tools is the inability to provide highly precise and repeatable machining operations. Also, the precision of spacing and the often required parallelism of the grooves and cuts may have a pronounced effect on the aesthetics of the finished product.

In addition, while there are numerous routing devices that exist today, these devices are limited in their functions and capabilities. Typically, conventional routers require an entire host of jigs and fixtures to perform varied router operations. For example, conventional router devices typically do not provide adequate flexibility in converting from a decorative tool to a tool having joining capability. Furthermore, when working with medium and large sized workpieces, it is essential that the workpiece is securely fixed in relation to the moving router device. While there are numerous devices to assist hand held operations of the router device, these devices often yield imprecise machining operations due to the precarious positioning of the router device relative to the workpiece. For instance, devices for assisting hand held router operations typically require an attachment to the workpiece and/or router device. The operator is then required to manually guide and apply the router device to the workpiece in the proper orientation.

Moreover, conventional router devices have limited ability to present a workpiece in a wide range of angles and planes in relation to the tool bit. More particularly, conventional router tools and devices which are employed for making angular cuts in workpieces usually are limited to a fixed angle or to a narrow range of angles relative to the edge of the workpiece. Thus, if grooves must be made, for example, at very acute angles in relation to the edge of a workpiece, these devices may be of no assistance.

Moreover, when face milling a workpiece, typical router machine tools require that the router be inverted with the bit facing up in the Z-direction. The workpiece is then placed with the side to be milled face down on the machine tool work surface. In order to machine, for example, a pocket-type cut within the face down surface of the workpiece, the machining action is not visible to the operator. As a result, the precise positioning, starting, and stopping of the desired cut is difficult and requires extensive rigging beyond the physical configuration of the typical router machine tool.

Thus, a need exists for a router machining tool capable of producing a plurality of precisely spaced and repeatable cuts in one or more workpieces. Furthermore, a need exists for a router machining tool capable of performing an entire array of router operations without the need for additional fixtures and jigs. There is also a need for the capability of presenting a workpiece at any angle in relation to a tool bit. Furthermore, there is a need for a machining device which carries the router in the normal bit down orientation, such that the router is securely, adjustably, and positively suspended over a workpiece, allowing for machine controlled motion of the router in relation to the workpiece. The structure of the present invention contains a solution to the aforementioned problems. As defined below, the present invention provides a significant improvement over currently known machine tools for performing router operations.

SUMMARY OF THE INVENTION

Briefly, the present invention satisfies this need and overcomes the shortcomings of the prior art through the provision of a multiple-axis machining apparatus, which includes a first table forming a horizontally disposed upper surface and having an opening for mounting a first tool in an inverted position therein and for projecting a first bit upward through said opening and above said upper surface. The horizontal upper surface has first and second axes intersecting each other in perpendicular relationship and the opening is centered on a vertical third axis, intersecting the first and second axes in perpendicular relationship therewith. A fence assembly may guide movements of a workpiece along the upper surface of the first table. A second table assembly may be removably attached to the underside of the first table. This second table assembly may be rotated in three dimensions. A carriage assembly may accommodate a second tool and permit movement of the second tool in a direction parallel to the first axis. The second tool may be mounted to the carriage assembly in the upright position with a second bit oriented in a downward position parallel to the third axis. A positioner assembly variably permits movement of the carriage assembly in a direction parallel to the second axis and variably permits movement of the fence means in a direction parallel to the second axis in relation to the upper surface of the first table in a precise and repeatable manner.

The carriage assembly includes means for raising and lowering the second tool in a direction parallel to the third axis. This carriage assembly may comprise a pair of horizontally disposed elongate members arranged in parallel spaced relation and extending in a direction parallel to the first axis. Each of the members have first ends opposing second ends, and the first ends may be joined by a first transverse support bar, and the second ends may be joined by a second transverse support bar. The carriage means may include a removable carriage slidably engageable with the guide members.

The removable carriage may include a support plate for mounting the second tool, and engagement means extending from the support plate. The engagement means may be adapted for engaging the elongate members so as to facilitate the slidable movement of the carriage in the direction parallel to the first direction. Preferably, the engagement means include two pairs of extension flanges, wherein each pair is adapted to embrace one of the elongate members.

Typically, the elongate members include a guide rod and a support rod. The guide rod may have two cylindrical guide bushings slidably attached thereto, wherein the two guide bushings are adapted for attachment to two respective extension flanges of the carriage. The support rod is adapted to also support one pair of the extension flanges.

Typically, the first table includes attachment means for securing an item to the upper surface. The attachment means may comprise one or more elongated T-slots formed on the upper surface of the first table. The T-slots may be used, for example, to attach a mitre gauge or a wooden workpiece to the surface of the first table.

The fence assembly includes an elongate fence body. The fence body may be mounted to the ends of the first and second transverse support bars of the carriage means. The fence body is positioned so that a fence surface is perpendicular to the upper surface of the first table. The fence assembly may include an attachment means for attaching an accessory to the fence.

The second table assembly may include means for moving the second table assembly in a direction parallel to the first axis. In order to facilitate such movement, the second table assembly may have a mounting bracket configured for connection to an elongated slot formed on the underside of the first table. Typically, the second table assembly is used in conjunction with the second tool mounted in the carriage.

A third table assembly may also be employed with the present invention. This third table assembly may be slidably attached to the guide rod and be moveable in a direction parallel to the first axis. The third table assembly may have a work surface which may be positioned in three dimensions. Typically, the third table assembly is used in conjunction with the first tool mounted in the opening of the first table.

It is therefore a primary object of the present invention to enhance the art of routing and woodworking.

It is another object of the present invention to provide a machining device which is capable of effecting a plurality of precisely spaced and repeatable machining operations in one or more workpieces.

It is yet another object of the present invention to provide a machining apparatus which brings greater accuracy and safety to machining operations.

It is another object of the present invention to provide a flexible machining apparatus having the capability of performing virtually an unlimited number of machining operations.

It is still another object of the present invention to provide a multiple-axis machining apparatus which is capable of positioning a workpiece at any desired angle and in any desired plane in relation to a tool bit.

It is another object of the present invention to provide a multiple-axis routing apparatus for use with both heavy duty industrial routers and light duty routers.

It is still another object of the present invention for use with plunge-type routers.

It is another object of the present invention to provide a multiple-axis machining apparatus which is readily and easily convertible from a joining tool to a decorative tool.

It is yet another object of the present invention to provide a highly precise machining device capable of producing a plurality of precisely spaced and repeatable machining operations without the need for attachable fixtures or jigs.

It is still another object of the present invention to provide a machining device which permits highly accurate router operations with the router bit in a face-down position.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description taken in conjunction with the accompanying drawings in which:

DETAILED DESCRIPTION OF THE PREFERRED EMBODIMENTS

It will be readily apparent that the components of the present invention, as generally described and illustrated in the figures, could be arranged and designed in a wide variety of different configurations. Thus, the following detailed description of the presently preferred embodiments of the multiple-axis machining apparatus of the present invention, as represented in FIGS. 1–16, is not intended to limit the scope of the invention, as claimed, but is merely representative of the presently preferred embodiments of the invention. The presently preferred embodiments of the invention will be best understood by reference to the drawings, where like parts are designated with like numerals.

Figure 1:
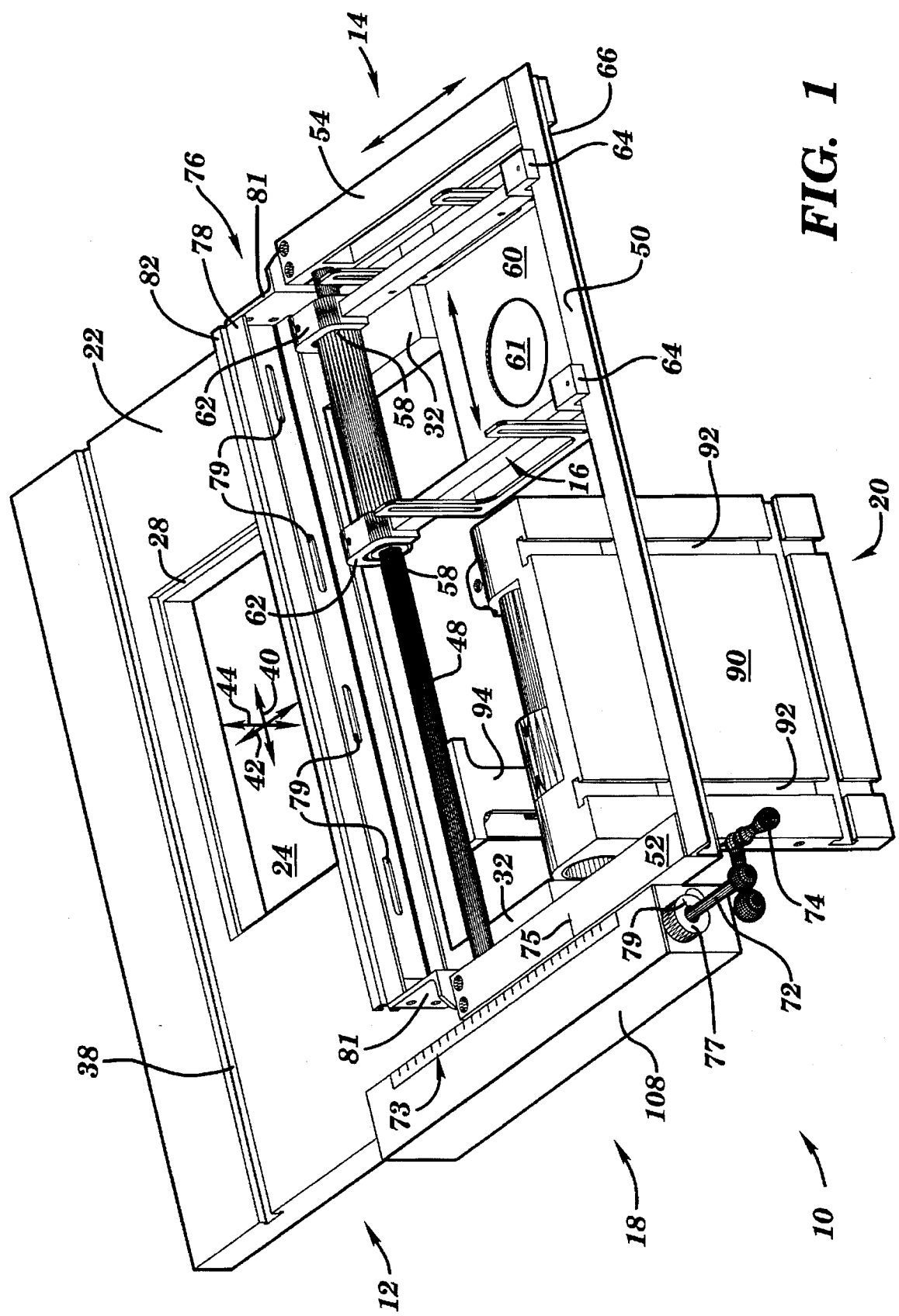
FIG. 1 is an isometric view of a multiple-axis machining apparatus constructed in accordance with the principles of the present invention, including a first table having an opening therein for mounting a router in the inverted position, a carriage assembly having a carriage slidably attached thereto, a fence structure attached to the carriage assembly, a positioner assembly for moving the carriage assembly, and a second table assembly mounted to the underside of the first table and underneath the carriage assembly.

In reference to the drawings, and more particularly to FIG. 1, there is shown in accordance with the preferred embodiments of the present invention, a multiple-axis machining apparatus 10. Multiple-axis machining apparatus 10 includes a first machining table 12, a carriage assembly 14 having a carriage 16 mounted thereto, a fence structure 76 for guiding and positioning workpieces along table 12, a positioner assembly 18 for moving carriage assembly 14 and fence structure 76, and a second machining table 20 positioned underneath carriage assembly 14 and mounted to the underside of first table 12.

First table 12 may form a horizontally disposed planar upper surface 22. As shown in FIG. 1, upper surface 22 has first and second axes 40 and 42 intersecting each other in a perpendicular relationship. A vertical third axis 44 intersects first and second axes 40 and 42 at the center of an opening 24 formed in first table 12. Throughout this specification, any direction parallel to first-axis 40 shall be designated as the X-direction, any direction parallel to second-axis 42 shall be referred to as the Y-axis, and any direction parallel to third-axis 44 as the Z-direction. It should be noted that when the X-Y-Z directions are referenced throughout this specification, it is meant to include both positive and negative directions, as common when describing coordinate systems.

Figure 15:
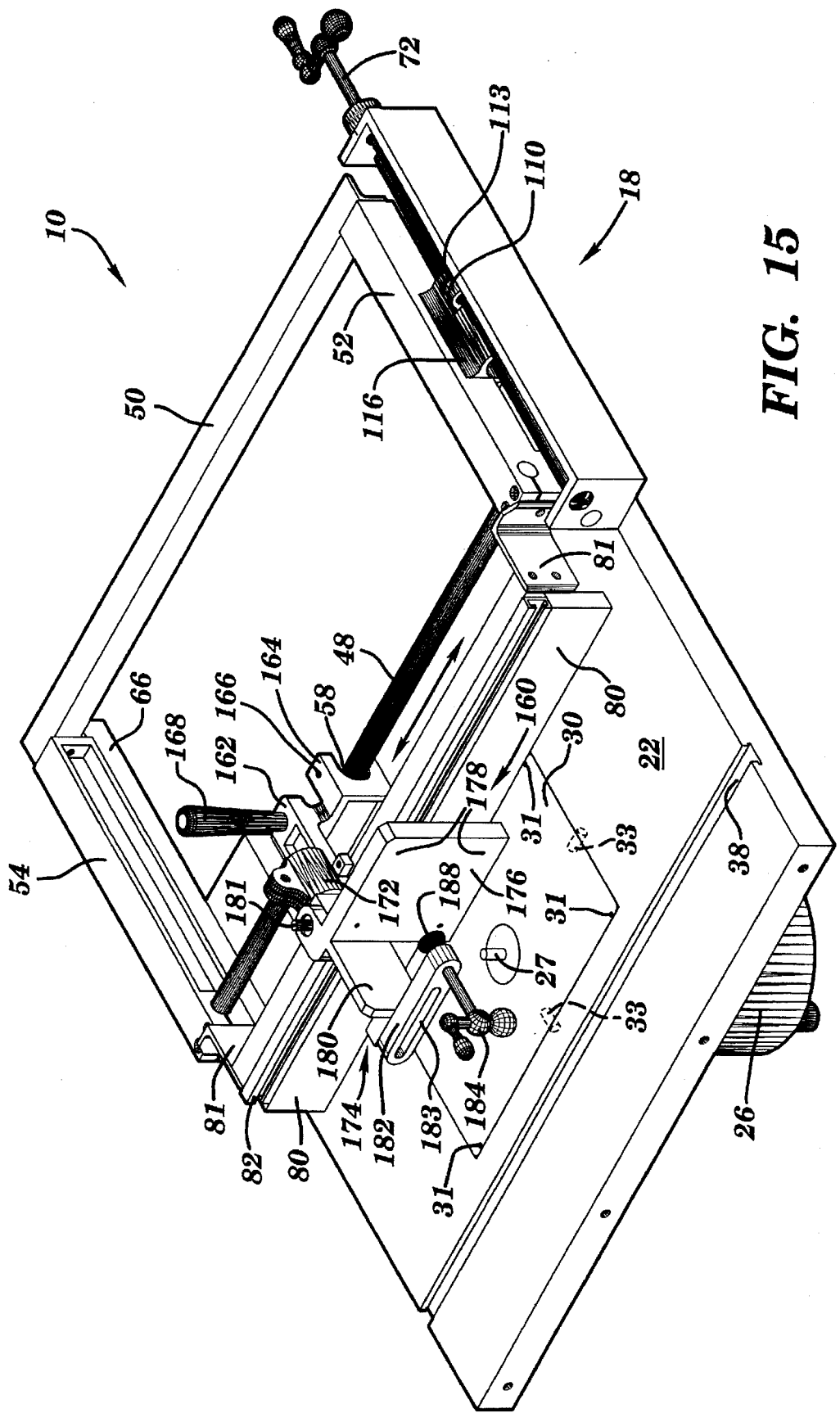
FIG. 15 is an isometric view of the multiple-axis machining apparatus of the present invention, including a third table assembly slidably mounted to the carriage assembly, and a router mounted to the first table in the inverted position.

Opening 24 may be formed in a central location of table 12 for mounting a first tool 26, such as a router 26 therein. While opening 24 may take any geometric shape, it is preferred that opening 24 is shaped like a rectangle or square. A rabetted ledge 28 is formed at the periphery of opening 24 so as to facilitate the alignment and support of a drop-in tool mounting plate 30. As shown in FIG. 15, first router 26 may be mounted to drop-in tool mounting plate 30 and thereafter inserted into opening 24 in the inverted position so that a router bit 27 faces upward and protrudes above upper surface 22, in a direction parallel to axis 44. Once router 26 is dropped into position, the upper surface of mounting plate 30 may be made co-planar with the upper surface 22 of table 12. Co-planarity may be achieved by employing mechanical fasteners 31, i.e., screws, in the top four corners of mounting plate 30. Also, mounting plate 30 may be fitted with mechanical fasteners 33, i.e., screws in two adjacent edges of mounting plate 30 to facilitate a snug fit in opening 24. Screws 33 may thus be threadable parallel to plane of the upper surface of mounting plate 30 and perpendicular to screws 31. Screws 33 may be adjusted so as to effect a tight fit for plate 30 in opening 24.

Operationally, first router 26 is secured stationary and rigidly in opening 24 so that a workpiece can be passed over or along the rotating bit 27. Drop-in router mounting plate 30 may be made of any suitable material, including clear acrylic and phenolic plastics.

In reference back to FIG. 1, upper surface 22 may include one or more T-slots 38 formed thereon for attaching accessories thereto, such as a mitre gauge, or adjustable stops, guards, and hold-downs. Also, T-slot 38 may be employed to secure one or more workpieces to upper surface 22 of table 12. Conventional mechanical means, such as carriage-bolts and wingnuts (not shown), may be used to secure the various accessories to T-slots 38.

Figure 2:
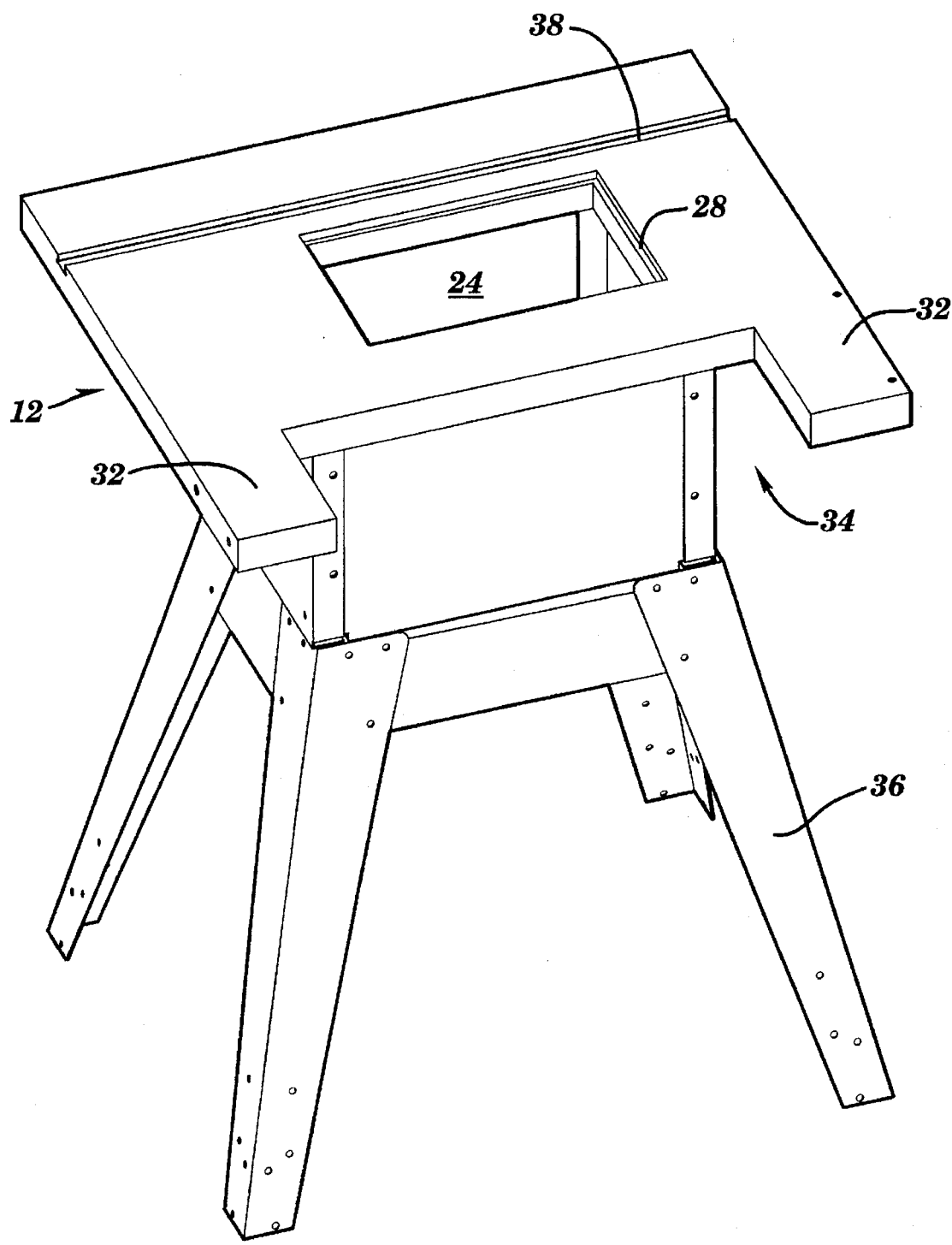
FIG. 2 is a view of the first table of FIG. 1 having legs mounted thereto.

As can be seen in FIG. 2, first table 12 may be shaped so that a pair of wings 32 protrude from one end thereof. This configuration thus leaves a cutaway region 34 between the pair of wings 32. An optional leg assembly 36 may be attached to the underside of table 12 so that the table can be presented at a desired height, such as counter height.

Table 12 of the present invention is preferably constructed of a structurally strong and durable material. For this reason, table 12 is preferably fabricated of cast iron. Cast iron is preferred because of its ability to withstand the negative influences associated with temperature and humidity changes. Cast iron, for instance, does not warp easily, and possesses excellent damping characteristics. While cast iron is preferred for table 12, other suitable materials may be substituted therefor. For example, solid cast-aluminum, laminate, plastic, and wood are a few examples of alternative materials which may be suitable for table 12. As shown from the underside in FIG. 12, the structure of table 12 may be formed in a honeycomb configuration. By employing a honeycomb configuration, the weight of table 12 may be reduced while the structural integrity is maintained.

Figure 3:
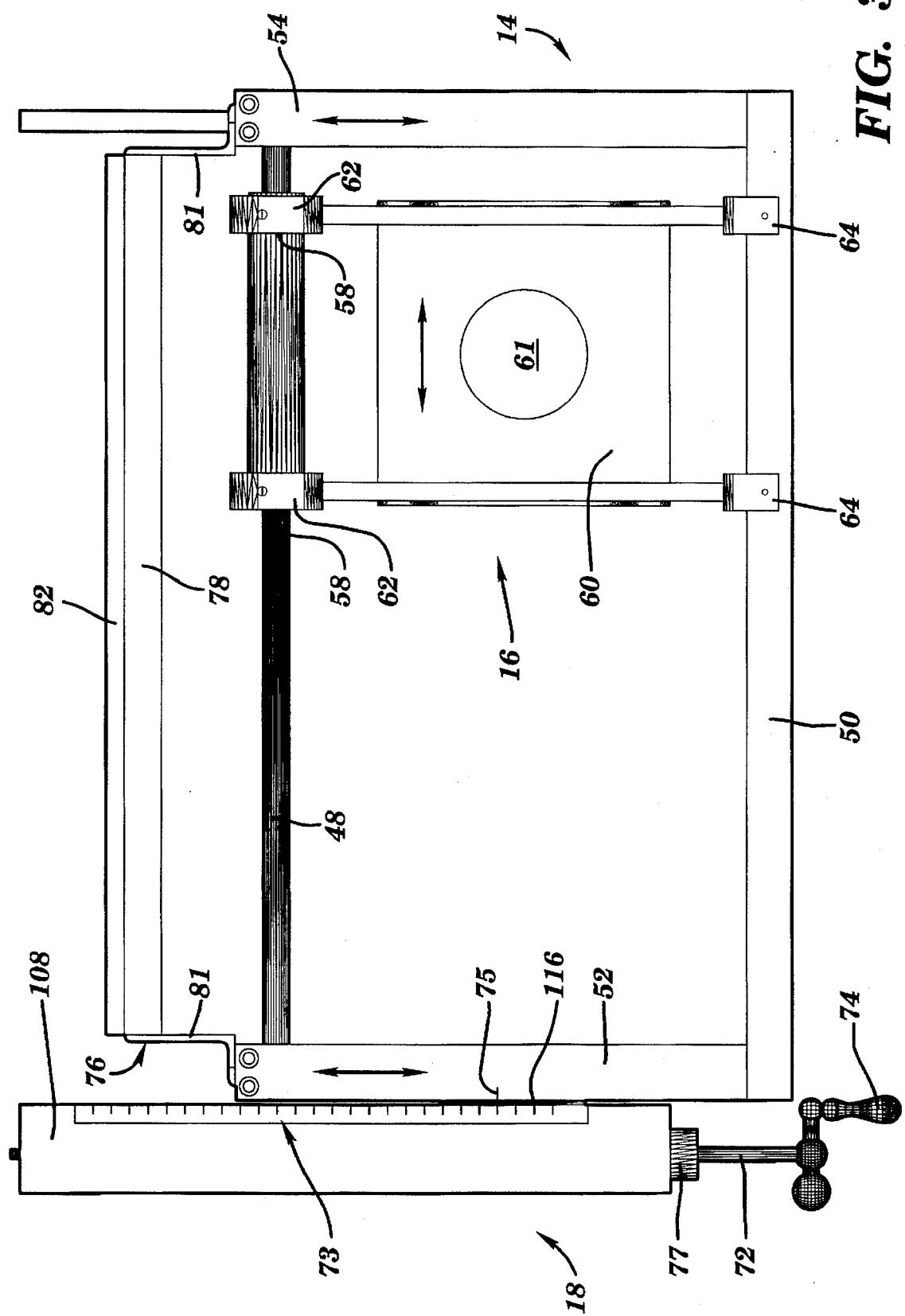
FIG. 3 is a top plane view of the positioned assembly, and the carriage assembly of FIGS. 1–2.
Figure 4:
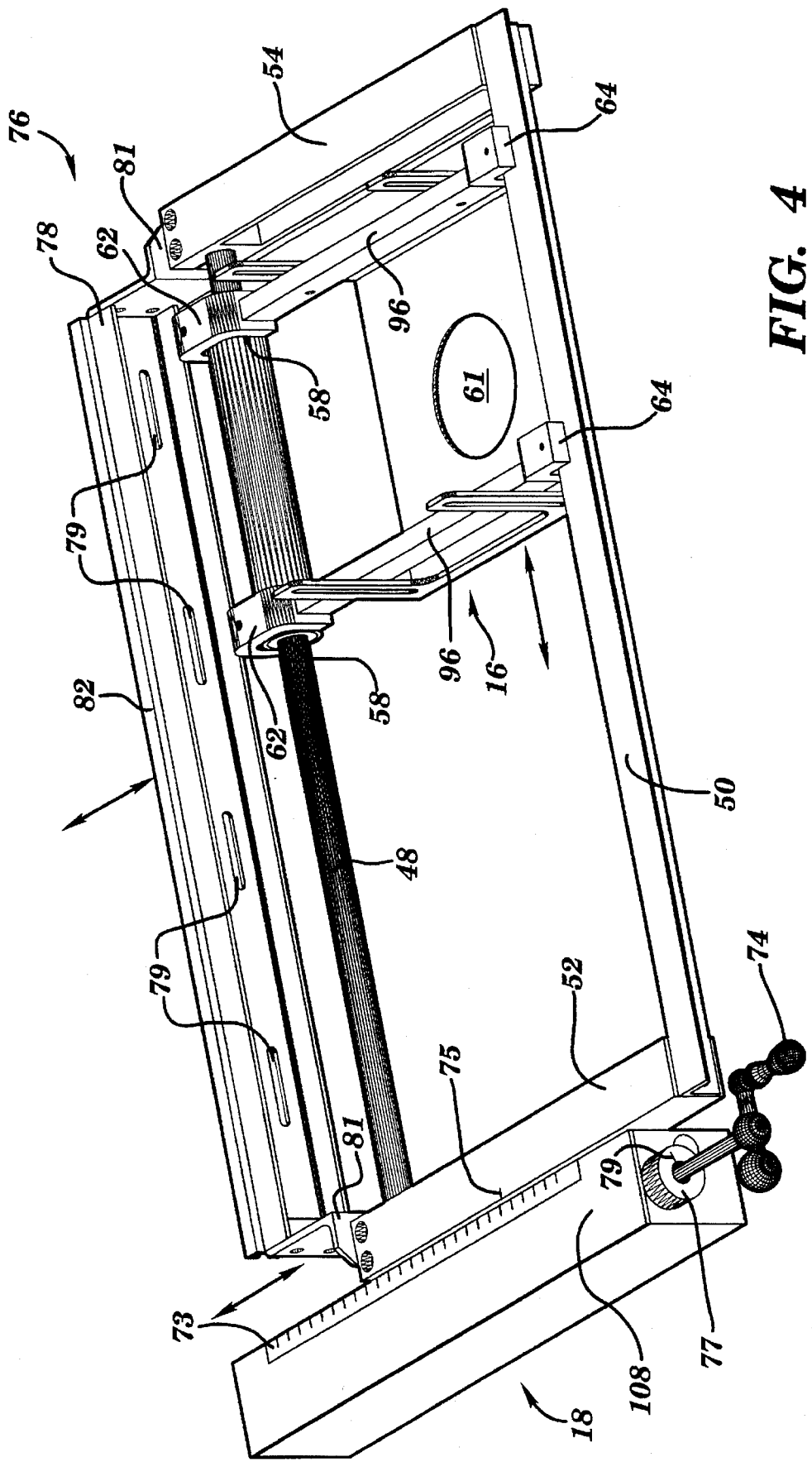
FIG. 4 is an isometric view of FIG. 3 showing the positioner assembly and carriage assembly.

FIGS. 3 and 4 show carriage assembly 14 of the present invention detached from most of the other components of multiple-axis machining apparatus 10. Positioner assembly 18 lies adjacent to one side of carriage assembly 14. An attachment block 116 may physically secure positioner assembly 18 to carriage assembly 14. Carriage assembly 14 provides a means for moving a second tool 46, such as router 46 (see FIG. 13 and 14), in the X-direction. Carriage assembly 14 includes removable carriage 16 for mounting router 46 in the normal upright position therein such that a bit 47 of second tool 46 oriented downward and parallel to third axis 44 (see FIG. 13 and 14). In addition to providing a means for moving second tool 46 in the X-direction, carriage assembly 14 may include means for raising and lowering second tool in the Z-direction, the details of which will be described more fully hereinafter.

Carriage assembly 14 may include a pair of horizontally disposed members, such as guide rod 48 and support rod 50, arranged in parallel spaced relation to one another. A first transverse support rod 52 attaches the first ends of rods 48 and 50 and a second transverse support rod 54 attaches second ends of rods 48 and 50. As shown in FIG. 3, transverse support rod 52 is adjacent to and attached to positioner assembly 18 through the provision of an attachment block 116. Carriage 16 may be secured to rods 48 and 50, and be slidably moved therealong in the X-direction. Carriage 16 may include an engagement means for facilitating the slidable engagement of carriage 16 with rods 48 and 50.

Guide rod 48 may be cylindrical in shape. One or more guide bushings 58 may be slidably secured to guide rod 48. In the preferred embodiment, two bronze guide bushings 58 are attached to guide rod 48 so as to facilitate movement of carriage 16 in the X-direction. Guide rod 48 is a high precision guide rod, and is intended to accurately and precisely guide carriage 16 in a plane parallel to the plane formed by first axis 40 and second axis 42.

Support rod 50 may be elongate and angled in cross-section, and as such may be referred as an angled support rod. Both rods 48 and 50 are preferably of the same length and may be employed in conjunction with one another to facilitate the smooth, non-binding linear X-direction motion of carriage 16 along rods 48 and 50.

Figure 5:
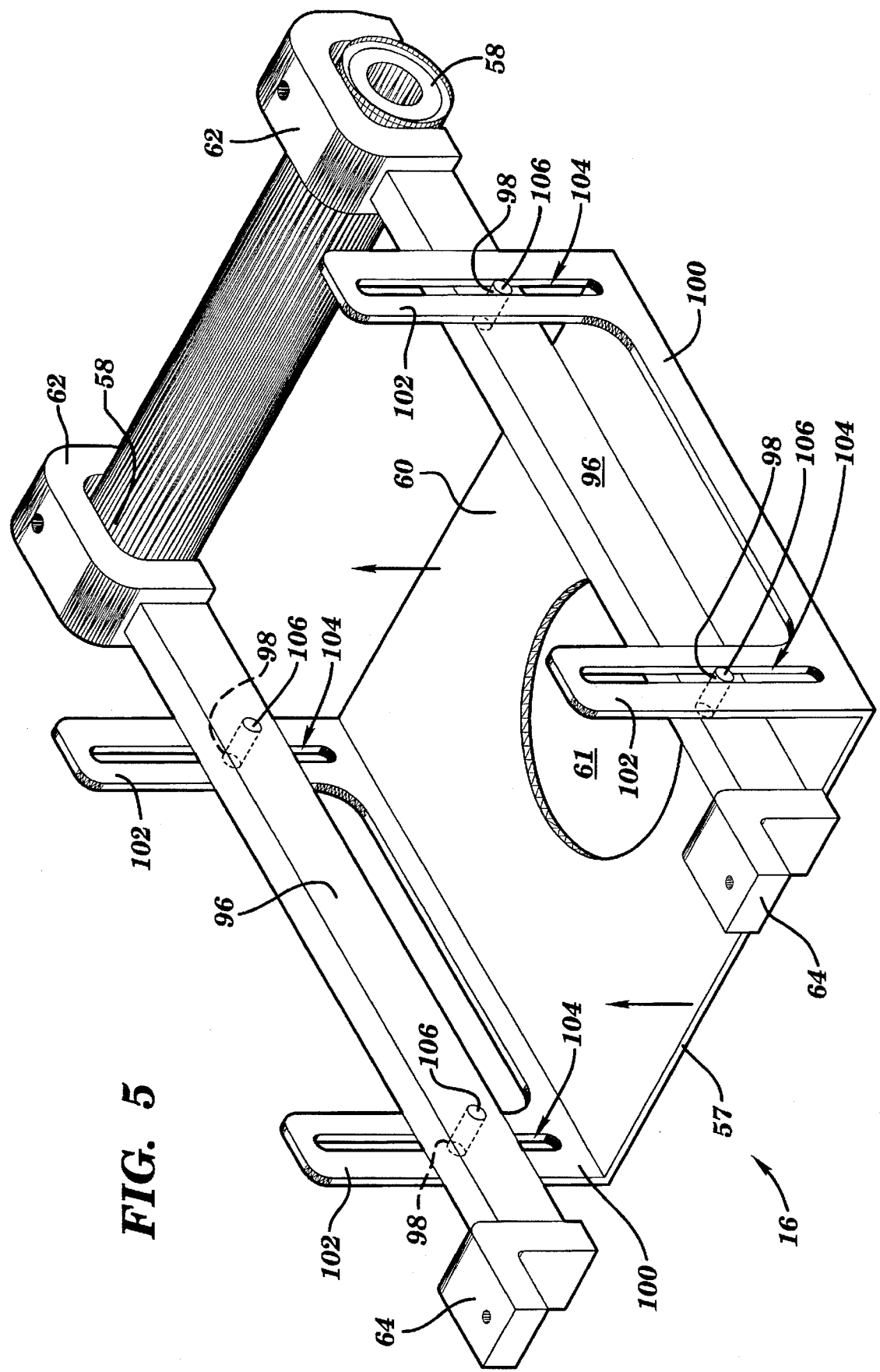
FIG. 5 is an isometric view of the carriage of FIGS. 1 and 3–4 constructed in accordance with the principles of the present invention.

In reference to FIG. 5, carriage 16 may include a tool support plate 60, and an engagement means adapted so that carriage 16 may engage rods 48 and 50 and slide therealong. Support plate 60 may include an opening 61 so that a tool bit, i.e., router bit 47 may protrude below the bottom surface of support plate 60 (see FIGS. 13 and 14). Support plate 60 thus accommodates a router 46 in the normal upright position. The engagement means may comprise at least one guide rod extension flange 62 adapted to embrace guide rod 48 and at least one support rod extension flange 64 adaptable to embrace support rod 50. As can be seen from the figures, there are preferably a total of four extension flanges associated with support plate 60, namely, a pair of extension flanges 62 adaptable to guide rod 48 and a pair of extension flanges 64 adaptable to support rod 50. Each extension flange 62 and 64 should be configured for embracing the specific configuration of its respective rod. Therefore, each extension flange 62 may be C-shaped for accommodating cylindrical bushings 58 which are secured to cylindrical guide rod 48. Each extension flange 64, however, may be L-shaped, or angled, having a flat bottom surface formed thereon, to accommodate the shape and the flat upper surface of angled support rod 50.

Each guide rod extension flange 62 may include means for removably securing each guide rod extension flange 62 to its respective bushing 58. For example, conventional mechanical securing means, such as set screws may be employed to removably secure each extension flange 62 to its respective bushing 58. Support rod extension flange 64 may simply rest on the upper surface of support rod 50. During movement of carriage 16 along rods 48 and 50 in the X-direction, the bottom surface of extension flanges 64 slide along the upper surface of support rod 50. Preferably, the coefficient of friction between the mating surfaces of extension flanges 64 and support rod 50 is sufficiently low to facilitate a smooth sliding motion therealong. Because carriage assembly 14 preferably utilizes only one high precision guide rod 48 in order to achieve X-direction movement of carriage 16, carriage assembly 14 may be called a single-track guidance assembly.

Carriage 16 may include a means for raising and lowering support plate 60 in relation to rods 48 and 50. As described above, there are preferably four extension flanges, namely two guide rod extension flanges 62 and two support rod extension flanges 64. As can be seen best in FIG. 5 of the drawings, each guide rod extension flange 62 may be connected to an associated support rod extension flange 64 by an interconnecting rail 96. Rail 96 may simply be an elongate bar extending between two associated flanges. Once carriage 16 is mounted on guide rod 48 and support rod 50, rails 96 are disposed transverse to rods 48 and 50.

In further reference to FIG. 5, an outer edge 57 may be formed around the periphery of support plate 60. The two sides of outer edge 57 which are positioned transverse to rods 48 and 50 when carriage 16 is attached to rods 48 and 50 may have a wall 100 attached thereto, extending above the upper surface of support plate 60. Wall 100 may be formed integral to support plate 60 or otherwise mechanically fastened thereto. In order to increase the structural rigidity of carriage 16, wall 100 may angle around the corners of support plate 60. Each wall 100 may include a pair of branches 102. Preferably, there are a total of two walls 100 for a total of four branches 102 extending in the Z-direction in relation to support plate 60. Each branch 102 may include an elongate slot 104 centrally bored through the length thereof. Each elongate slot 104 is configured for alignment with a respective hole 98 formed through rail 96. For each rail 96, there preferably are two holes 98. A pin 106 may extend through an aligned hole 98 and slot 104. By utilizing pins 106 and other mechanical fastener means, rails 96 may be securely fastened to branch 102. Because of the elongate structure of slot 104, each pin 106 may be adjusted vertically in the Z-direction in slot 104. Once support plate 60 is adjusted to a desired height, by varying the position of pins 106 in slots 104, support plate 60 may be secured in the desired position.

Figure 14:
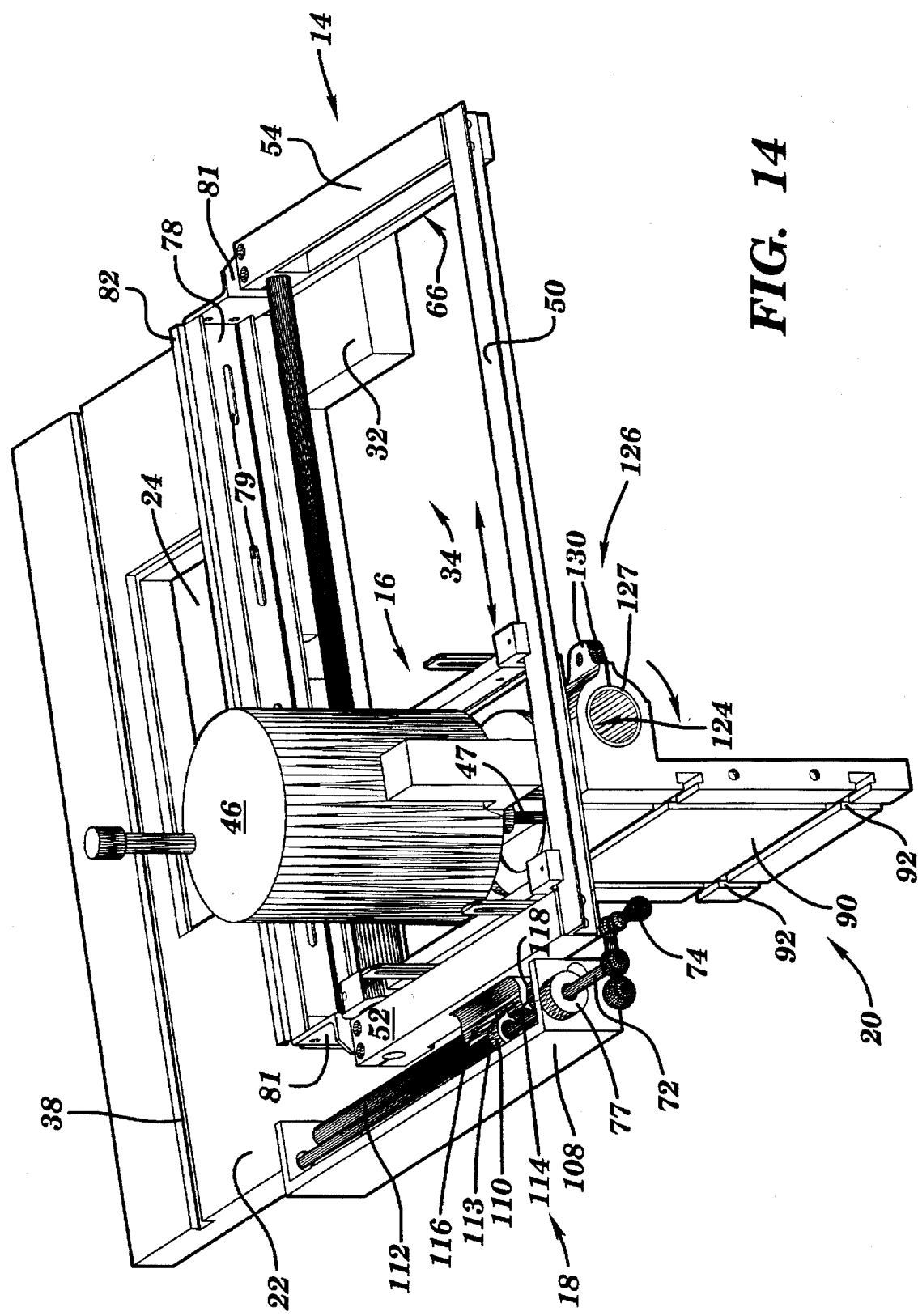
FIG. 14 is an isometric view of the multiple-axis machining apparatus showing the components of the positioner assembly in detail, also showing a router mounted to the carriage in the normal position.

In reference now to FIG. 14, carriage 14 may have router 46 mounted in the upright position therein, where router bit 47 faces vertically downward in the Z-direction, protruding through the opening 61 of support plate 60. By raising and lowering support plate 58, router 46 may be adjustably positioned in the Z-direction for performing numerous machining operations such as mortising. It is intended that both fixed-base and plunge routers be used in conjunction with carriage 16. If a plunge router is used, an even greater vertical displacement of router 46 may be achieved. Therefore, both the router 46 and carriage 14 may be moved vertically in the Z-direction to adjust the clearance of the router bit 47 in relation to a workpiece. In conjunction with second table assembly 20 which is mounted underneath carriage assembly 14, carriage 14 and attached tool 46 may be used to perform numerous machining operations, as will be more fully described hereinafter.

By utilizing positioner assembly 18 of the present invention, carriage assembly 14 may be variably positioned in a repeatable and precise manner in the Y-direction. As can be seen in FIG. 1, positioner assembly 18 may include a lead screw 72 disposed in a direction parallel to second axis 42. Lead screw 72 is a high precision screw, which enables the apparatus of the present invention to achieve high precision positioning of carriage assembly 14 without binding or backlash. A handwheel 74 may be employed to rotate lead screw 72 for positive and negative movement of carriage assembly 14.

The lead screw components of positioner assembly 18 are housed in a housing 108 which resembles a long rectangular box. Housing 108 is rigidly secured by mechanical or other means to one of the wings 32 of first table 12.

In reference now to FIG. 14, the components of positioner assembly 18 contained in housing 108 may be observed in detail. Lead screw 72 may extend through housing 108 and out one end thereof. Hand wheel 74 is attached to the end of lead screw 72 which extends outside of housing 108. Lead screw 72 has a plurality of threads along the length thereof. The number of threads per inch selected for lead screw 72 may vary depending on the applications intended for apparatus 10. A lead screw nut 110 is threadably attached to lead screw 72. A guide rod 112, in spaced parallel relation to lead screw 72, may extend the length of housing 108. Preferably, guide rod 112 is cylindrical in shape. One or more bushings 114 may be slidably attached to guide rod 112.

An attachment block 116 may be employed to interconnect carriage assembly 14 to bushings 114. In order to achieve such a connection, attachment block 116 may be rigidly secured to first transverse support rod 52 of carriage assembly 14. Attachment block 116 may have a cylindrical cavity 118 formed therethrough for accommodating bushings 114 and guide rod 112. The peripheral surfaces of bushings 114 may be secured to the internal wall of cavity 118. In order to translate the rotation of lead screw 72 into positive or negative movement of carriage assembly 14 in the Y-direction, lead screw nut 110 may be rigidly secured to attachment block 116. In order to facilitate attachment of block 116 to nut 110, a cylindrical tube piece 113 is formed on block 116 and mechanically secured to nut 110.

Operationally, as an operator turns handwheel 74, lead screw nut 110 may be advanced in either the positive or negative Y-direction. As lead screw nut 110 advances, the rigid attachment of lead screw nut 110 to attachment block 116 causes carriage assembly 14 to also be advanced. In order to facilitate this movement of carriage assembly 14 in the Y-direction, second transverse support rod 54 may slide on the upper surface of guide track 66. Guide track 66 can be rigidly secured to one of the wings 32 of first table 12.

In the preferred embodiment, lead screw 72 comprises an ACME lead screw with an anti-backlash ACME nut assembly. Lead screw 72 may have 16 threads per inch. If such a lead screw is selected, a quarter turn of handwheel 74 would displace carriage 14 a distance of 1/64th of an inch. With such a lead screw as described herein, a positioning accuracy and repeatability of less than 0.005 inches may be achieved.

As shown in FIG. 1, positioner assembly 18 may include a measuring scale 73 attached to the top of housing 108. Scale 73 may include, for example, gradations of 1/64th of an inch and can be used as a coarse scale for determining Y-direction movement of carriage assembly 14. A fixed indicator point 75 may be placed on first transverse support rod 52. In addition to scale 73, dial measuring scale 77 may be positioned on the face of housing 108 where lead screw 72 exits. Dial measuring scale 77 may be circular in cross-section having its center aligned with lead screw 72. Preferably, scale 77 is divided into eight forty-five degree segments. An indicator point 79 is attached to lead screw 72, facing radially outward. By rotating handle 74 one-eighth of a turn, carriage assembly 14 may be advanced 1/128 of an inch. Furthermore, by rotating handle one-half of a turn, carriage assembly 14 may be advanced a distance of 1/32 of an inch. While scale 77 is preferably divided into eight forty-five degree segments, it should be understood that different degree segments may be employed therefor.

Figure 6:
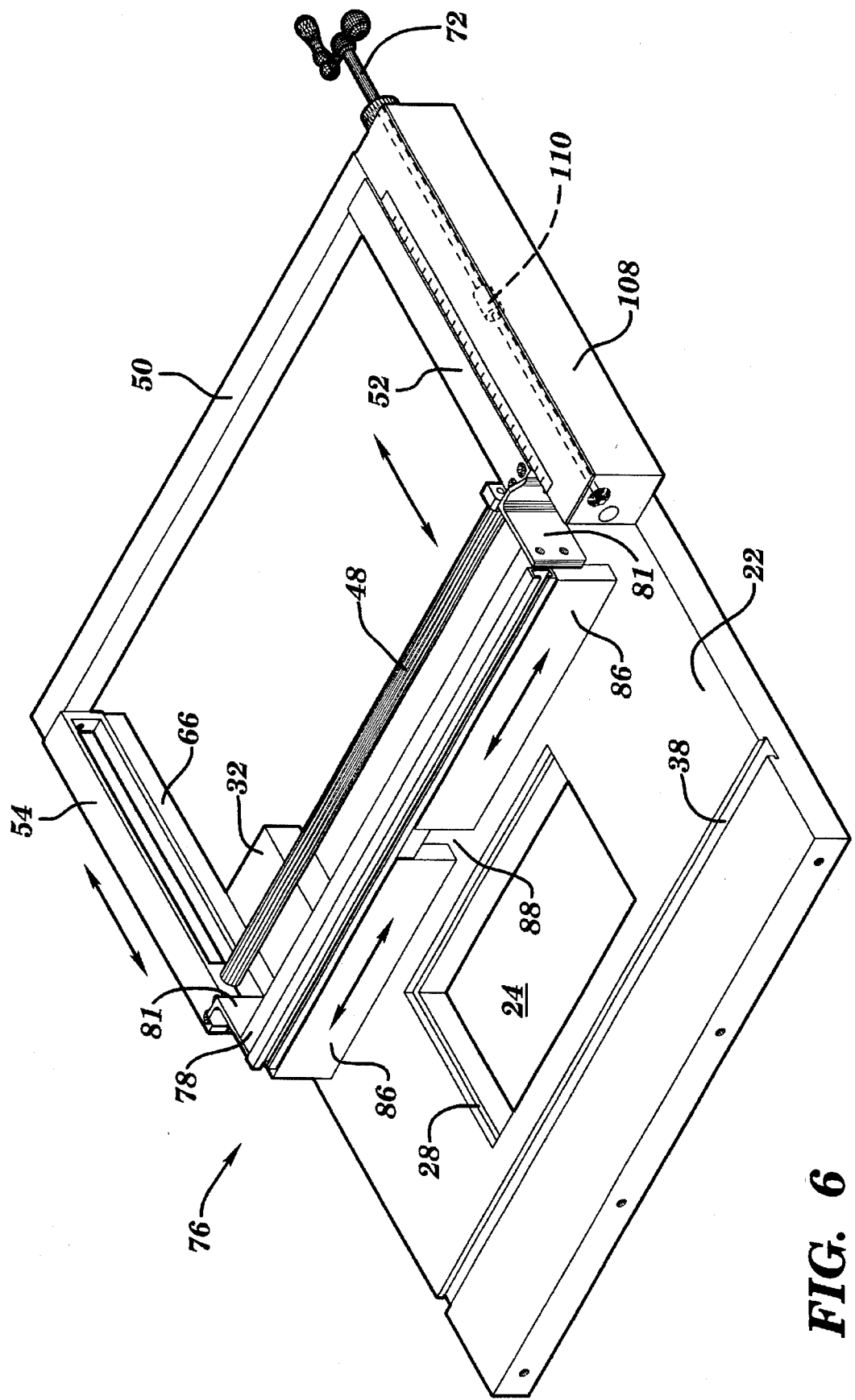
FIG. 6 is an isometric view showing the first table, a guide fence assembly, the carriage assembly, and the positioner assembly.
Figure 7:
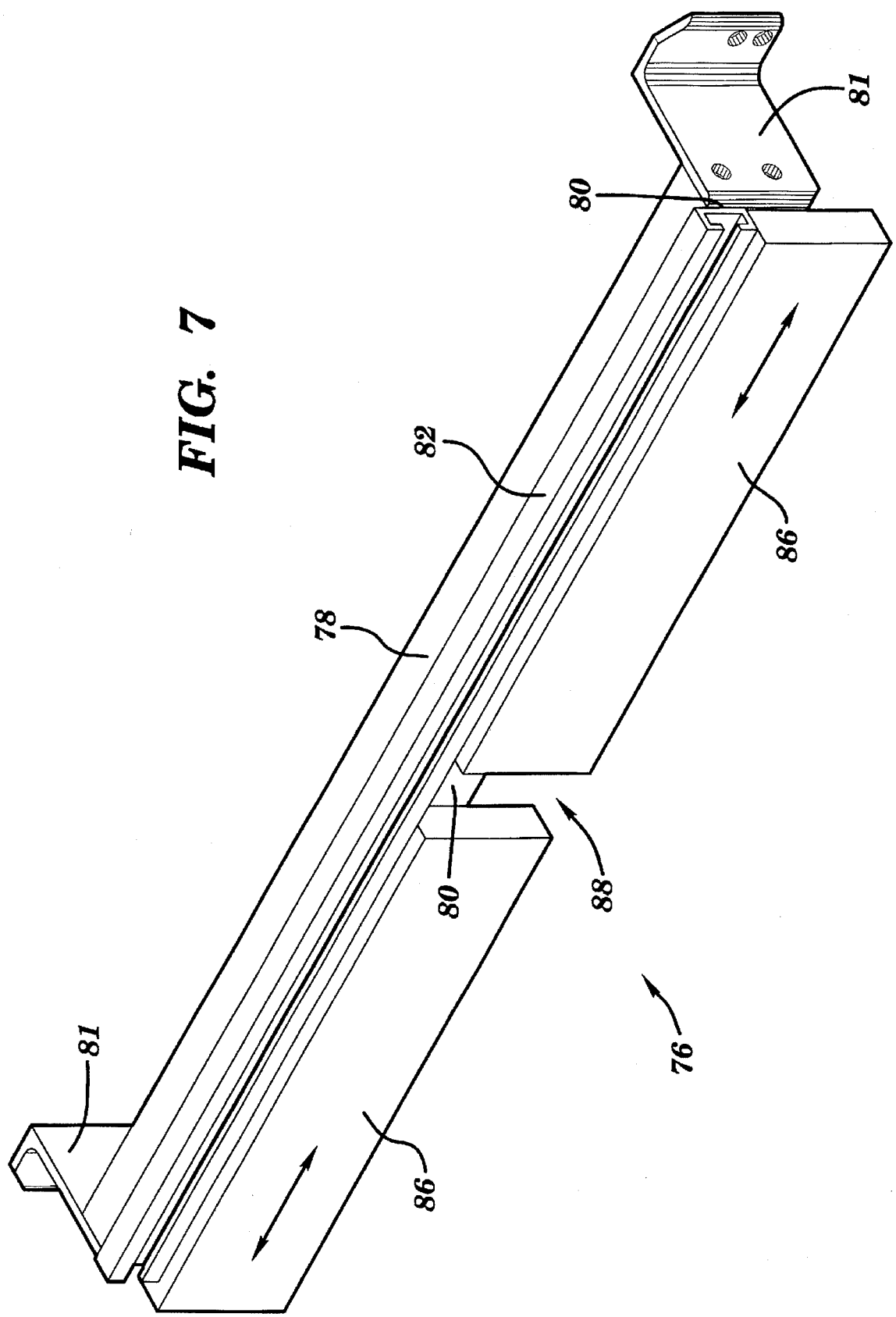
FIG. 7 is an isometric view of the guide fence of the present invention shown detached from the other components of the multiple-axis machining apparatus.

As can be seen best in FIGS. 6 and 7, a fence structure 76 may be removably attached to carriage assembly 14 for guiding movements of a workpiece or a plurality of workpieces along upper surface 22 of first table 12 and for positioning a workpiece in relation to a first bit 27 of first tool 26. By attaching fence structure 76 to carriage assembly 14 and employing positioner assembly 18, the fence structure can be precisely and repeatably positioned along upper surface 22 in the Y-direction. Fence structure 76 may comprise an elongated fence body 78 removably mounted to the ends of first transverse bar 52 and second transverse bar 54. Two angled end pieces 81 may be employed to attach fence body 78 to transverse support bars 52 and 54. Fence body 78 may include a fence surface 80 disposed perpendicular to the upper surface 22 of first table 12.

Fence structure 76 can include a means 82 for attaching one or more accessories thereto. This attachment means 82 may comprise an elongate T-slot assembly 82 mounted to the upper portion of fence surface 80. As shown in FIG. 1, a plurality of horizontally disposed slots 79 may be formed through elongate body 78. In conjunction with mechanical fasteners (not shown), slots 79 may be used to securely fasten blocks 86 to fence surface 80. Preferably, elongate T-slot 82 covers only a small area of fence surface 80, extending across the top portion of fence surface 80. T-slot 82 may be used to mount various accessories, such as clamp downs. The remaining area of fence surface 80 can then accommodate the one or more blocks 86 which the workpiece may be held against during various machining operations, such as milling.

Blocks 86 should be comfortably placed against fence surface 80. Preferably, two blocks 86 may be positioned against fence surface 80 so as to form a changeable void 88 between the inside ends of the blocks. As the positioned assembly 18 advances fence structure 76 in a direction towards router 26, router bit 27 may be positioned within void 88 and therefore surrounded by the ends of the pair of blocks 86. If desired, the ends of the pair of blocks 86 may lie adjacent to one another so that void 88 is non-existent. Typically, block 86 may comprise a wooden piece of wood. Other blocks, however, fabricated from a wide variety of materials, may be substituted therefor.

Figure 12:
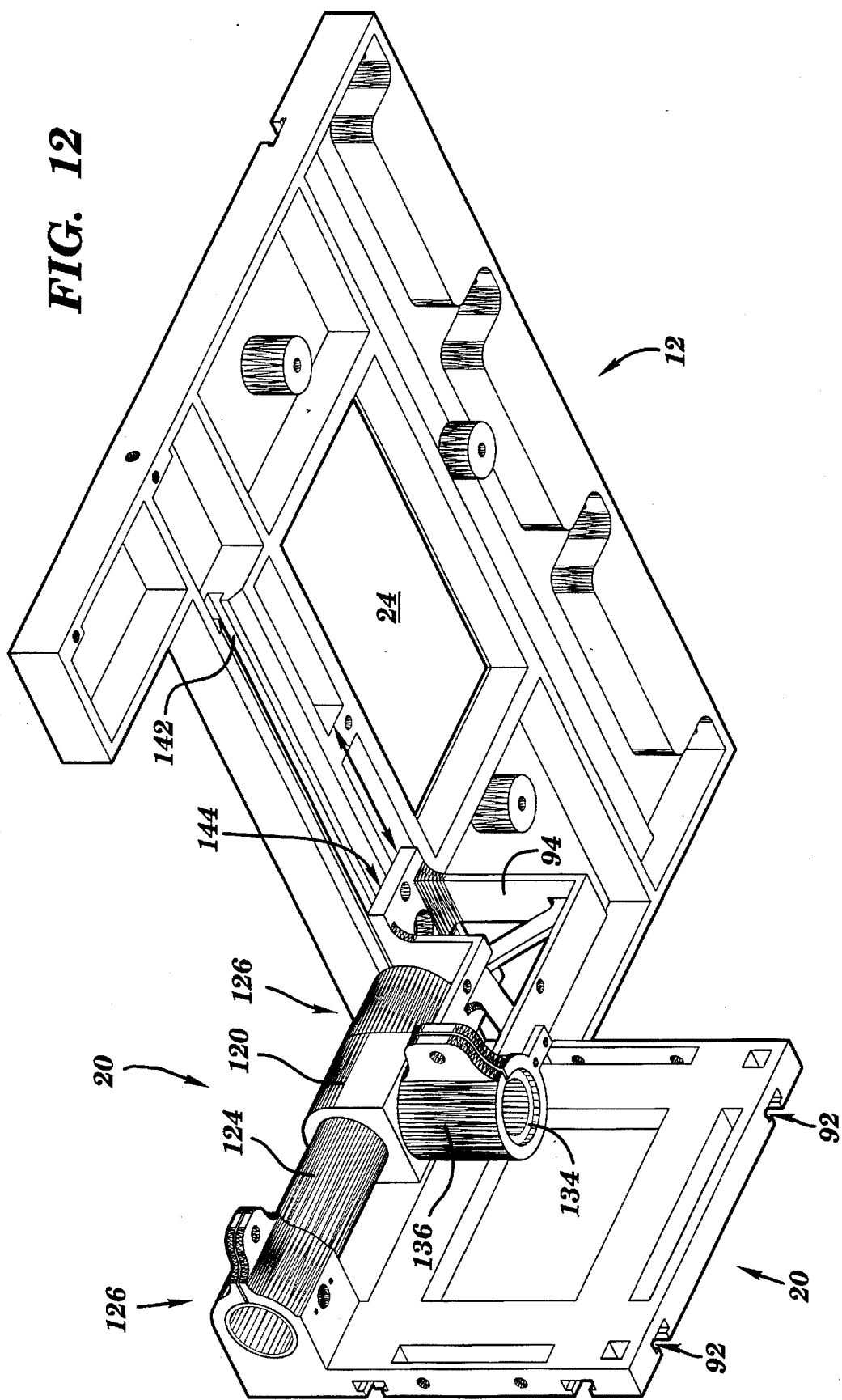
FIG. 12 is an isometric view from the underside of the first table, showing the means for attaching the first table to the second table assembly.
Figure 13:
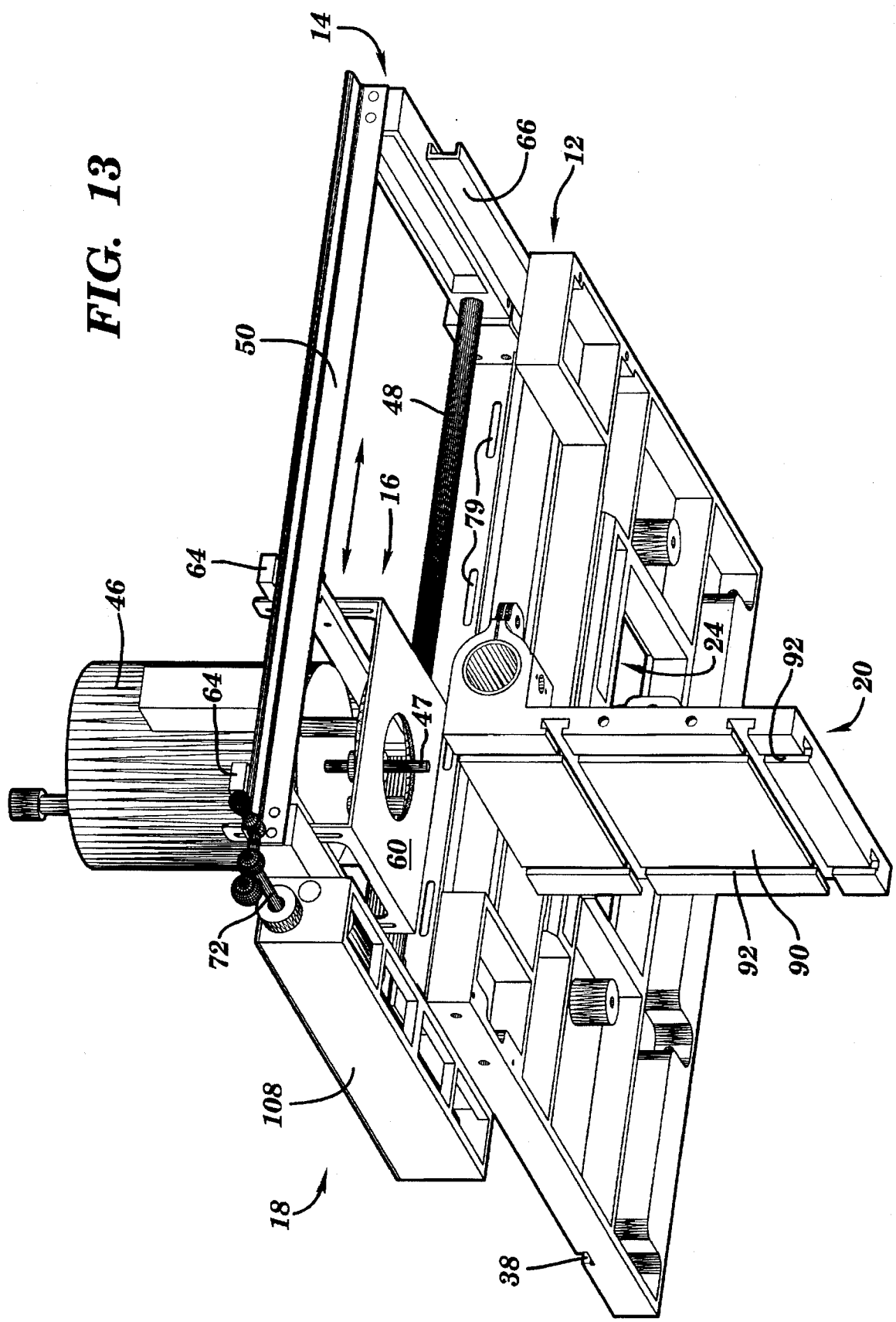
FIG. 13 is an isometric view from the underside of the first table, showing a router positioned in the carriage assembly, and a random relationship of the router bit of the router and the second table assembly.

As can be seen best in FIGS. 1, 12, and 13, second table assembly 20 may be removably attached to the underside of first table 12. Second table assembly 20 is positioned underneath carriage assembly 14 so that machining operations may be performed by tool 46 on a workpiece mounted to a work surface 90 of second table assembly 20. Preferably, work surface 90 is flat and may include one or more attachment means, such as T-slots 92. Like T-slots 38 of first table 12, T-slots 92 of second table assembly 20 may be employed to secure accessories and workpieces thereto.

Figure 8:
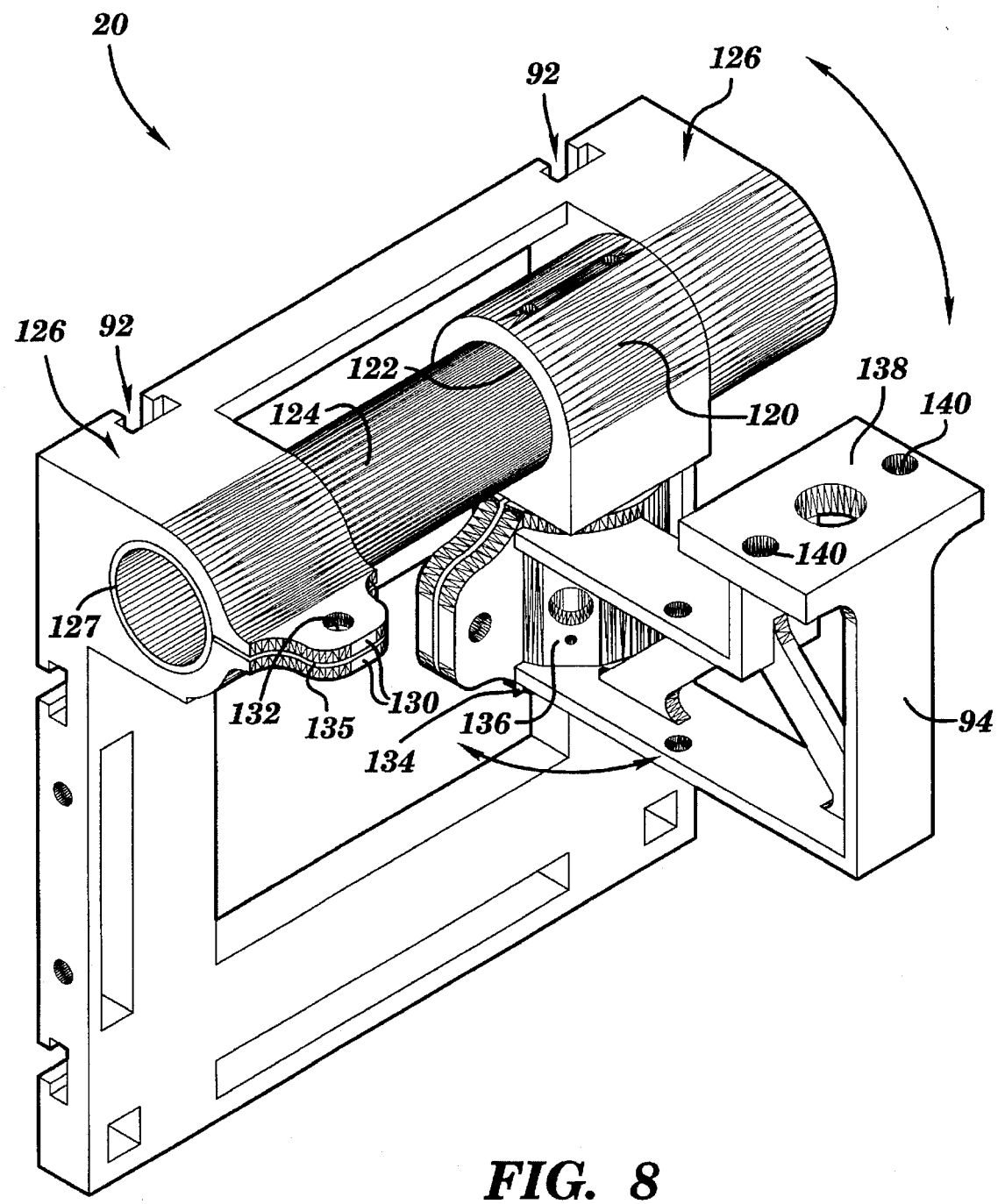
FIG. 8 is an isometric view of the backside of a second table assembly of the present invention shown detached from the other components of the multiple-axis machining apparatus.
Figure 9:
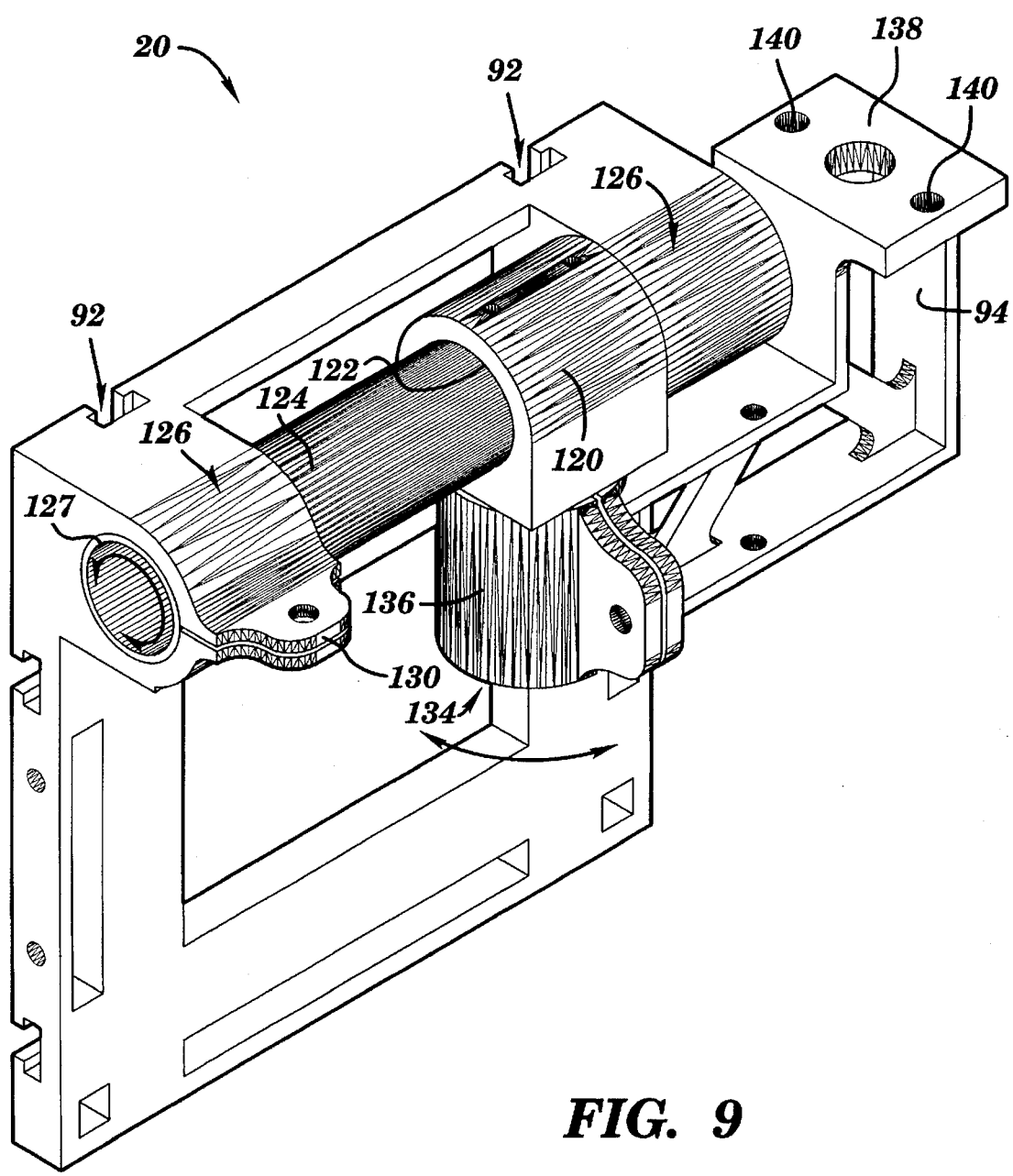
FIG. 9 is another isometric backside view of the second table assembly which, in conjunction with FIG. 8, depicts the Z-axis rotation of the second table assembly.

In reference now to FIG. 8, second table assembly 20 is shown detached from the other components of the multiple-axis machining apparatus 10. As can be seen from the backside, second table assembly 20 may include a mounting bracket 94 which is used to removably mount second table assembly 20 to the underside of first table 12, the details of which will be described hereinafter.

Second table assembly 20 may include a housing member 120 protruding therefrom. Housing member 120 has a cylindrical cavity 122 formed therethrough for the insertion of a first cylindrical tube 124 therein. Housing member 120 may have a central axis which is parallel to the plane of work surface 90. Preferably, first cylindrical tube 124 is rigidly secured within cylindrical cavity 122. Housing member 120 may be flanked on both sides by clamps 126. A cylindrical bore 127 may be formed through each clamp 126 for insertion of first cylindrical tube 124 therein. The central axes of clamps 126 and housing member 120 are preferably co-axial.

Each clamp 126 comprises two curved members 128, inwardly formed, which level off to form corresponding flat ledges 130. A gap 135 may separate corresponding ledges 130. An opening 132 is formed through each flat ledge 130. Both openings 132 are aligned to one another so that conventional mechanical fasteners may be used to secure clamps 126 to cylindrical tube 124. Therefore, corresponding flat ledges 130 may be compressed so as to close or decrease gap 135. By this configuration, it is intended that second table assembly 20 may be rotated about the longitudinal central axis of tube 124. Once table 20 is rotated to a specific desired location, fasteners may be employed to tightly secure clamps 126 so that table 20 is rigidly positioned for performing a machining operation.

A second cylindrical tube 134 may be attached to housing member 120, extending in a direction perpendicular to the longitudinal axis of first cylindrical tube 124. An associated clamp 136 may rotatably embrace second cylindrical tube 134. Clamp 136 may be of similar construction to clamps 126. On one side of clamp 136, mounting bracket 94 extends therefrom. Mounting bracket 94 may resemble an L-shaped member, terminating in a connection pad 138. Connection pad 138 includes a plurality of holes bored therethrough for mechanically securing second table assembly 20 to the underside of first table 12. Second table assembly 20 may be routed about the longitudinal axis of second cylindrical tube 134. Once table assembly 20 is rotated to a desired location, fasteners may be employed to rigidly secure table assembly 20 in the desired position.

In reference now to FIG. 12, the underside of first table 12 may include an elongate slot 142 extending in a direction parallel to second axis 42. Elongate slot 142 preferably is a T-slot similar to the other T-slots disclosed hereinabove. An insert 144 may be slidably inserted into slot 142. Insert 144 can include mechanical means for fastening connection pad 138 of mounting bracket 94 thereto. Once connection pad 138 is attached to insert 144, second table assembly 20 may be slidably moved in the X-direction. Once second table assembly 20 is positioned at a desired location, mounting bracket 94 may be securely tightened to table 12.

Figure 10:
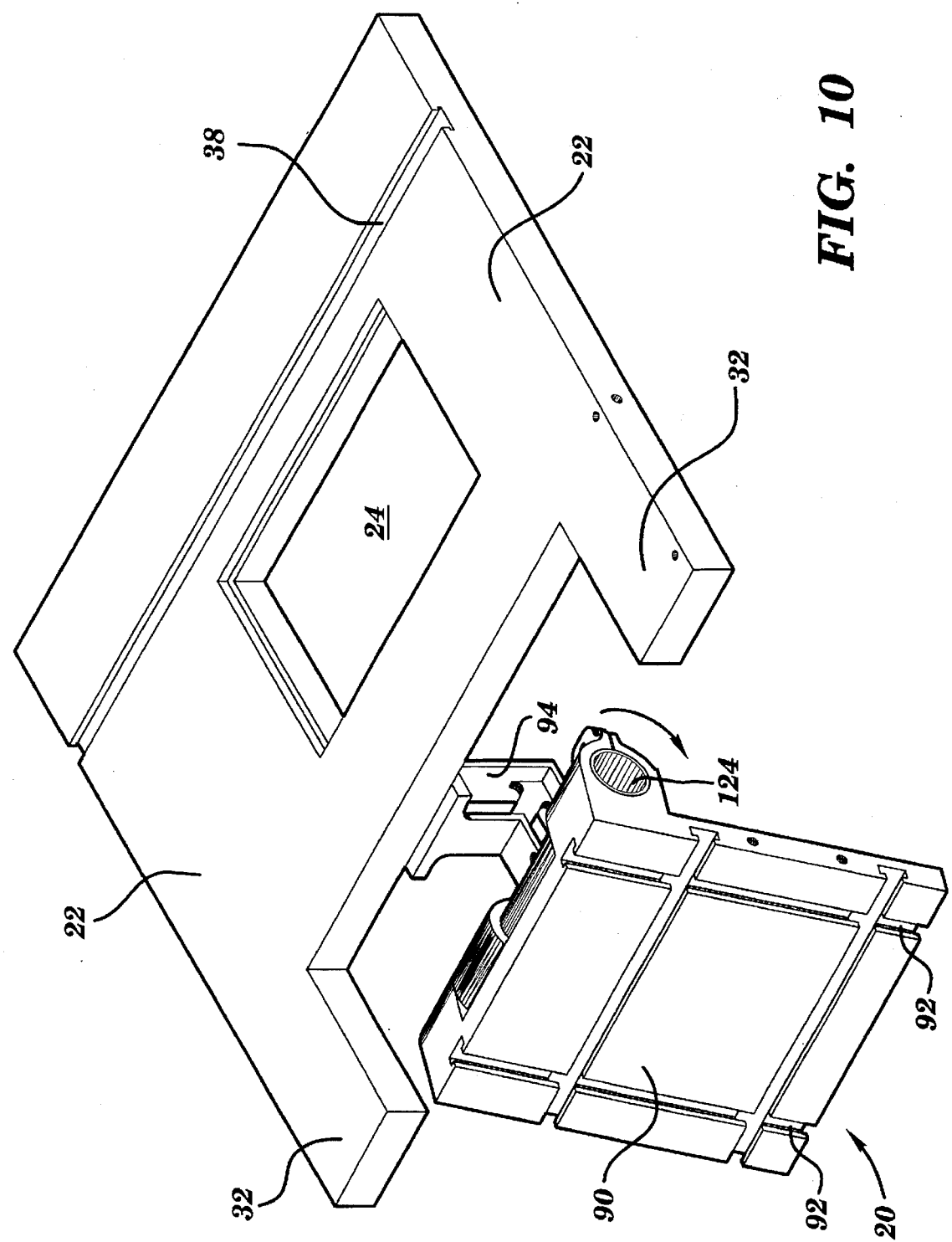
FIG. 10 is an isometric view of the second table assembly attached to the underside of the first table showing the second table assembly in one position.
Figure 11:
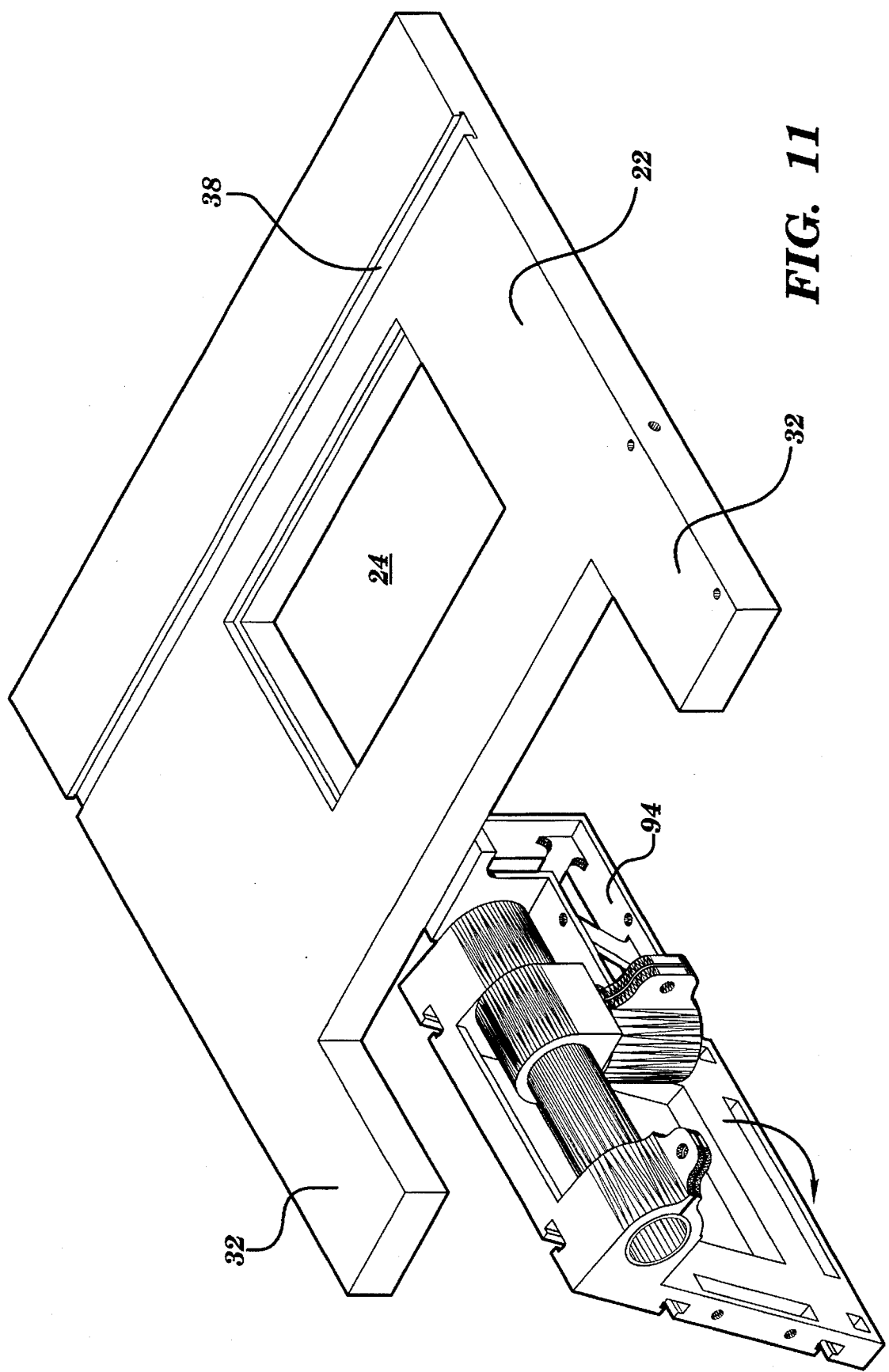
FIG. 11 is an another isometric view of the second table assembly attached to the underside of the first table, showing the second table assembly in a different position from the one shown in FIG. 10.

FIGS. 10 and 11 illustrate the adjustable positioning of table 20 in relation to first table 12. By rotating table 20 about tubes 124 and 134, the work surface 90 of table 20 may be presented in virtually any angular position in three dimensions. Typically, second table assembly 20 may be used principally for end and edge milling of a workpiece. FIG. 13 depicts table 20 in a vertical position, with router bit 47 of second router 46 facing downward. Other operations which may be performed with table 20 include through cuts, sliding dovetails, stopped sliding dovetails, stopped and pocket dodoes, stopped and pocket splines, and pocket mortises. It should be understood that by adjusting the position of table 20, all of these cuts may be performed on any facet of a workpiece. Moreover, all cuts may be performed at any angle or on any facet of the workpieces.

As can be seen in FIG. 15, the present invention may be equipped with a removable third table assembly 160. Third table assembly 160 is a moveable table assembly and may be slidably attached to carriage assembly 14, i.e., to guide rod 48, so as to facilitate the precise and repeatable positioning of a workpiece attached to third table assembly 160 in relation to tool bit 27 of router 26. By attaching third table assembly 160 to guide rod 48, extremely precise movement of assembly 160 in the X-direction may be achieved.

Figure 16:
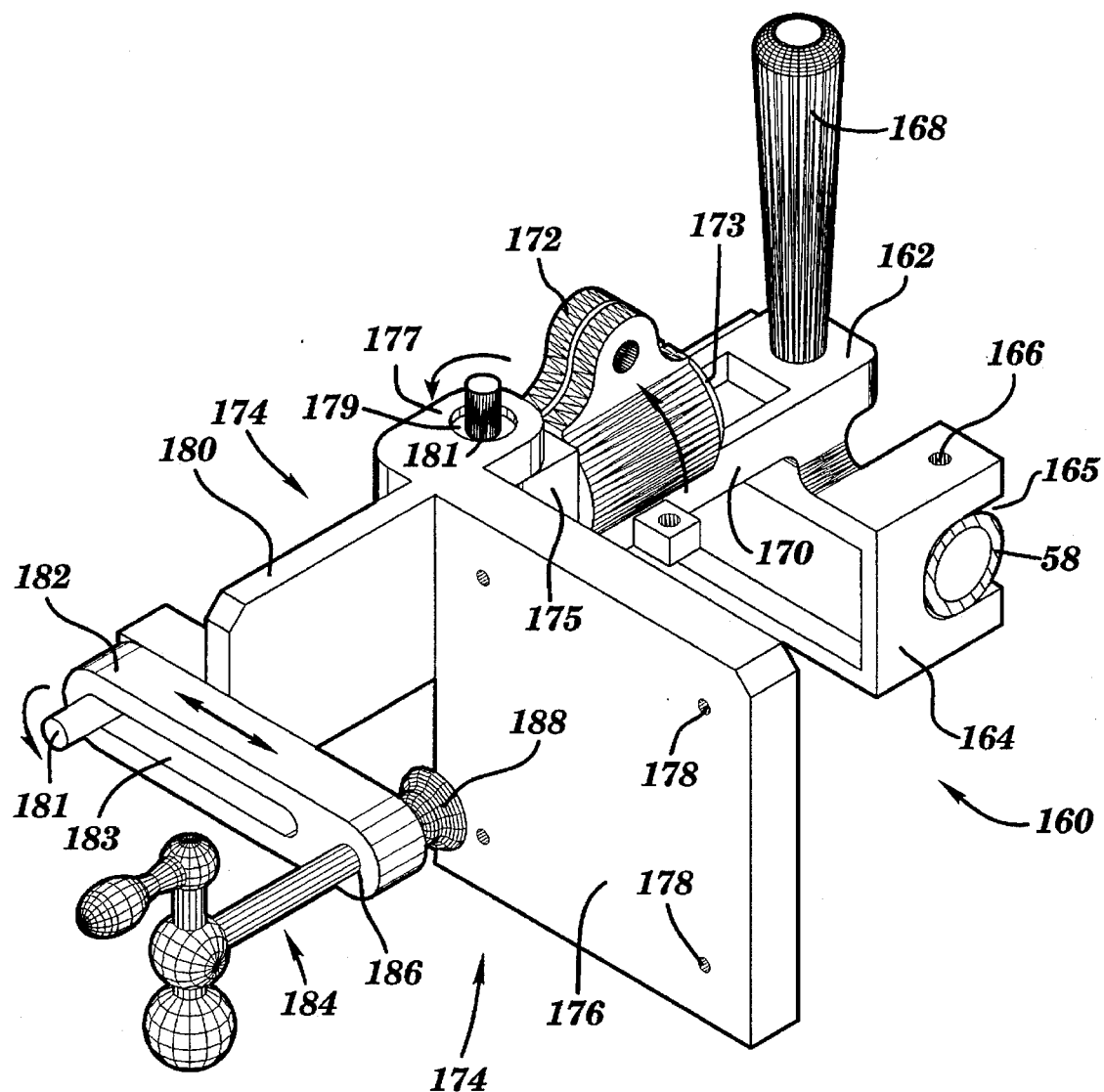
FIG. 16 is an isometric view detailing the third table assembly of FIG. 13 as detached from the other components of the multiple-axis machining apparatus.

As seen best in FIG. 16, third table assembly 160 is shown detached from the other components of the multiple-axis machining apparatus 10. Third table assembly 160 may include a support member 162 having two side brackets 164 for attaching assembly 160 to guide bushings 58 of guide rod 48. Each side bracket 164 includes a cylindrically shaped inner wall 165 which corresponds to the cylindrical shape of guide bushings 58. A threaded hole 166 may extend through the top of each side bracket 164 so that assembly 160 may be mechanically secured to bushings 58. A handle 168 extends off support member 162 in the Z-direction for an operator to grasp. By pushing and pulling handle 168, the operator can accurately maneuver third table assembly 160 along the guide rod 48 in the X-direction.

A branch 170 may extend off of support member 162 in a direction perpendicular to the longitudinal axis of guide rod 48. The bottom surface of a portion of branch 170 may rest on the upper surface of fence body 78 and slide therealong during X-direction motion. A clamp 172 may be rigidly attached to the top of branch 170. Clamp 172 may be of the same configuration as clamps 126 and 136 of second table assembly 20. A cylindrical tube 173 may extend through the cavity of clamp 172.

A hinge block 175 having a cavity (not shown) extending therethrough may be rigidly secured to one end of cylindrical tube 173. A workpiece presentation member 174 may be supported by the hinge block 175. Workpiece presentation member 174 may include a pair of flanges 177 flanking the opposed faces of hinge block 175. Each flange 177 includes a hole 179 which may be aligned concentric with the cavity of hinge block 175. A hinge pin 181 may be inserted through the cavity of hinge block 175 and through holes 179 of flanges 177 of presentation member 174. By this configuration, presentation member 174 may be rotated about the hinge pin 181. Standard fastening means (not shown) may be employed to lock presentation member 174 in a desired position.

Workpiece presentation member 174 may also include a workpiece face 176, which may include a plurality of holes 178 to facilitate attachment of a workpiece backing board (not shown). An extension bar 180 extends perpendicular to workpiece face 176. A slotted member 182 having an elongate slot 183 formed through the length thereof may be attached to extension bar 180. A pivot pin 181 may be attached to extension bar 180 so as to facilitate the rotation of member 182 about pivot pin 181. The structure of slotted member 182 also facilitates the movement thereof in a direction which is parallel to workpiece face 176. A T-bar handle assembly 184 may be threadably secured to a threaded hole 186 formed through member 182 so as to facilitate the positioning of clamp 188 in relation to face 176. Standard fasteners (not shown) may be employed to lock slotted member 182 in a desired position.

The multiple-axis machining apparatus 10 of the present invention may be employed to perform virtually an endless number of router operations on a workpiece. First table 12, second table assembly 20, and third table assembly 160 provide for a total of three work surfaces to which a work piece may be attached. Each of the work surfaces associated with the three tables presents a different type of machining operation. All three tables present work surfaces for effecting highly precise and repeatable router operations.

Operationally, a workpiece may be positioned on upper surface 22 of first table 12. The workpiece may be propped up against fence structure 76 so as to rigidly support the workpiece in relation to router bit 27 of first tool 26. T-slot 82 may be used to secure the workpiece to fence structure 76. By rotating hand wheel 74 of positioner assembly 18, the fence structure 76 may be precisely and repeatably positioned in the Y-direction in relation to the upper surface of first table 12. Therefore, the workpiece may be positioned in relation to bit 27 so that machining operations may be accurately and repeatably performed thereon. All length-wise and width-wise through cuts may be performed on the workpiece with table 12. For example, length-wise cuts include decorative edge milling and shaping, panel raising, splining, face milling, end laps, stile and rail joints, may all be performed on the workpiece. Width-wise through cuts may include, for example, dadoes, dovetail dadoes, tenons, and panel end cuts. Numerous other operations may also be performed by utilizing first table 12.

Alternatively, the second table assembly 20 may be employed to perform various machining operations on a workpiece. A workpiece may be secured to work surface 90 of table assembly 20, for example, by utilizing T slots 92. By rotating tubes 124 and 134, work surface 90, and therefore the workpiece, may be positioned in any desired plane. Once a desired position is selected, table assembly 20 may be locked in position. Furthermore, table assembly 20 may be slidably engaged within slot 142 of first table 12. Therefore, table assembly 20 may be selectively positioned in relation to table 12 in the X-direction. Router 46, mounted in carriage 16, and having router bit 47 protruding downward through opening 61, may be employed to perform various machining operations on the workpiece secured to work surface 90. As described hereinabove, router 46 may be selectively positioned in the X-direction along elongate members 48 and 50. Furthermore, support plate 60 of carriage 16 may be raised and lowered for performing various router operations on the workpiece. Furthermore, if a plunge router is employed, a greater vertical displacement may be achieved. Typically, the second table assembly 20 is employed to make through-type cuts, including stopped and pocket cuts. As stated hereinabove, all cuts can be performed on any facet of the workpiece and at any angle of the selected facet. As one can imagine, numerous other operations may also be performed with second table assembly 20.

The third table assembly 160 may also be employed to perform various routing operations on a workpiece. Third table assembly 160 may be removably attached to guide rod 48 so as to facilitate precise X-direction movement of table assembly 160. Typically, carriage 16 is removed from carriage assembly 14 to accommodate third table assembly 160. The slotted member may be adjustably positioned, and in conjunction with T-bar assembly 184, a workpiece may be attached to face 176. By rotating workpiece presentation member 174 about pin 181 and tube 173, the workpiece may be presented, in relation to tool bit 27, in virtually any plane. Once the desired position is selected, the third table assembly 160 may be locked into position, and various machining operations may be performed on the workpiece. Typically, the third table assembly is used to make width-wise and thickness-wise through cuts on workpiece ends. For example, table assembly 160 may be used in an entire array of machining operations to effect an entire array of width-wise or thickness-wise cuts, including dovetail joints, box joints, angled box joints, end splines, tenons and angled tenons, lap joints, bridle joints, and stile and rail joints.

While several aspects of the present invention have been described and depicted herein, alternative aspects may be effected by those skilled in the art to accomplish the same objectives. For example, while the presently preferred embodiments of the invention are directed to router tool, the structure of the present invention may accommodate numerous other tools, such as portable saws and motorized tool bit spindles. Accordingly, it is intended by the appended claims to cover all such alternative aspects as fall within the true spirit and scope of the invention.

What is claimed:

1. A multiple-axis machining apparatus, comprising:
   a first table forming a horizontally disposed upper surface and having an opening for mounting a first tool in an inverted position therein and for projecting a first bit upward through said opening and above said upper surface, wherein said horizontal upper surface has first and second axes intersecting each other in perpendicular relationship and said opening is centered on a vertical third axis, intersecting said first and second axes in perpendicular relationship therewith;
   carriage means operatively engaged with said first table for moving said carriage means in a direction parallel to said second axis; and
   a carriage slidably engaged in said carriage means for slidably moving said carriage in a direction parallel to said first axis, said carriage capable of holding a second tool in an upright position therein and for projecting a second bit in a downward position substantially parallel to said third axis.

2. The multiple-axis machining apparatus of claim 1, wherein said carriage means comprises a pair of horizontally disposed elongate members arranged in parallel spaced relation and extending in a direction parallel to said first axis, each of said elongate members having first ends opposing second ends, said first ends being joined by a first transverse support bar, and said second ends being joined by a second transverse support bar.

3. The multiple-axis machining apparatus of claim 2, wherein said one of said pair of elongate members comprises a cylindrical guide rod, said cylindrical guide rod having one or more guide bushings slidably attached thereto.

4. The multiple-axis machining apparatus of claim 3, wherein said one of said pair of elongate members comprises a support rod having a substantially flat upper surface formed thereon.

5. The multiple-axis machining apparatus of claim 4, wherein said carriage comprises:
   a support plate having a hole formed therein for projecting said second bit downward therethrough; and
   engagement means attached to said support plate for slidable engagement to said carriage means.

6. The multiple-axis machining apparatus of claim 5, wherein said engagement means comprises a plurality of extension flanges, at least one of said extension flanges slidably engageable with said one or more guide bushings of said cylindrical guide rod, and at least one of said extension flanges slidably engageable with said support rod.

7. The multiple-axis machining apparatus of claim 6, wherein said engagement means comprises a pair of guide rod extension flanges, and a pair of support rod extension flanges.

8. The multiple-axis machining apparatus of claim 7, wherein said cylindrical guide rod includes two guide bushings slidably attached thereto.

9. The multiple-axis machining apparatus of claim 8, wherein each one of said pair of guide rod extension flanges includes a cylindrical cavity formed therein for attachment to a respective bushing of said two guide bushings.

10. The multiple-axis machining apparatus of claim 9, wherein each one of said pair of guide rod extension flanges includes fastening means for securing each one of Said pair of guide rod extension flanges to a respective one of said two guide bushings.

11. The multiple-axis machining apparatus of claim 7, wherein each one of said pair of support rod extension flanges includes a flat bottom surface formed thereon for slidable engagement along the upper surface of said support rod.

12. The multiple-axis machining apparatus of claim 7, wherein said carriage includes means for raising and lowering said carriage in a direction parallel to said third axis.

13. The multiple-axis machining apparatus of claim 12, wherein said support plate includes a plurality of branches extending from said support plate in a direction parallel to said third axis, each of said plurality of branches having an elongate slot formed therein, each of said slots engageable with a respective one of said extension flanges to permit vertical displacement of said support plate.

14. The multiple-axis machining apparatus of claim 2 further comprising positioner means for moving said carriage means in a direction parallel to said second axis.

15. The multiple-axis machining apparatus of claim 14, wherein said positioner means comprises:
   a lead screw extending in a direction parallel to said second axis;
   a nut threaded to said lead screw;
   means for securing said nut to said first transverse support bar such that when said nut is threadably moved along said lead screw, said movement translates to said carriage means so that said carriage means is moved in a direction parallel to said second axis.

16. The multiple-axis machining apparatus of claim 14 further comprising fence means for guiding movements of a workpiece along said upper surface of said first table and for positioning said workpiece in relation to said first bit, wherein said positioner means facilitates the movement of said fence means in a direction parallel to said second axis.

17. The multiple-axis machining apparatus of claim 16, wherein said fence means comprises an elongate fence body, said fence body being mounted to said first and second transverse support bars, said fence body having a fence surface disposed perpendicular to said upper surface of said first table.

18. The multiple-axis machining apparatus of claim 17, wherein said fence means further comprises an attachment means for attaching an accessory to said fence.

19. The multiple-axis machining apparatus of claim 18, wherein said attachment means comprises an elongated T-slot.

20. The multiple-axis machining apparatus of claim 19, wherein said fence means further comprises at least one block placed against said fence surface.

21. The multiple-axis machining apparatus of claim 20, wherein said fence means further comprises a pair of blocks, said blocks positioned adjacent to said elongated T-slot, said pair of blocks being variably adjustable in a direction parallel to said first axis along said fence surface so as to form a changeable void between said pair of blocks.

22. The multiple-axis machining apparatus of claim 1, further comprising a second table assembly mounted to said first table.

23. The multiple-axis machining apparatus of claim 22, wherein said first table includes an elongate slot formed in an underside of said first table, said elongate slot formed in a direction parallel to said first axis, wherein said second table assembly includes a mounting bracket slidably engageable to said elongate slot.

24. The multiple-axis machining apparatus of claim 23, wherein said second table assembly further comprises a table having a work surface formed thereon, and means for mounting a workpiece to said work surface.

25. The multiple-axis machining apparatus of claim 24, wherein said second table assembly further comprises means for rotating said second table assembly in three dimensions.

26. The multiple-axis machining apparatus of claim 25, wherein said means for rotating said second table assembly in three dimensions comprises:
   means for rotating said table about an axis parallel to said third axis; and
   means for rotating said table about an axis perpendicular to said third axis.

27. The multiple-axis machining apparatus of claim 26 further comprising positioner means for moving said carriage means in a direction parallel to said second axis so as to facilitate the positioning of said second tool in relation to said work surface of said second table.

28. A multiple-axis machining apparatus, comprising:
   a first table forming a horizontally disposed upper surface and having an opening for mounting a first tool in an inverted position therein and for projecting a first bit upward through said opening and above said upper surface, wherein said horizontal upper surface has first and second axes intersecting each other in perpendicular relationship and said opening is centered on a vertical third axis, intersecting said first and second axes in perpendicular relationship therewith;
   a carriage assembly operatively engaged with said first table, said carriage assembly being moveable in a direction parallel to said second axis; and
   a moveable table assembly operatively engaged to said carriage assembly for moving said moveable table assembly in a direction parallel to said first axis, said moveable table assembly being rotatable about an axis parallel to said second axis.

29. The multiple-axis machining apparatus of claim 28, wherein said carriage assembly comprises a pair of horizontally disposed elongate members arranged in parallel spaced relation and extending in a direction parallel to said first axis, each of said elongate members having first ends opposing second ends, said first ends being joined by a first transverse support bar, and said second ends being joined by a second transverse support bar.

30. The multiple-axis machining apparatus of claim 29, further comprising positioner means secured to said carriage assembly for variably moving said carriage assembly in a direction parallel to said second axis.

31. The multiple-axis machining apparatus of claim 29, wherein said positioner means comprises:
   a lead screw extending in a direction parallel to said second axis;
   a nut threaded to said lead screw;
   wherein said nut is secured to said first transverse support bar such that when said nut is threadably moved along said lead screw, said nut movement translates to said carriage assembly.

32. The multiple-axis machining apparatus of claim 29, wherein said moveable table assembly comprises:
   a work surface formed on said moveable table assembly;
   means for slidably engaging said moveable table assembly to said carriage assembly;
   means for rotating said work surface about an axis parallel to said second axis;
   means for rotating said work surface about an axis perpendicular to said second axis; and
   means for securing a workpiece to said work surface.

33. The multiple-axis machining apparatus of claim 32, wherein said means for slidably engaging comprises a support member including a bracket with a cylindrical cavity extending in a direction parallel to said first axis, said cavity being slidably engageable to one of said elongate members.

34. The apparatus of claim 33, wherein said means for rotating said work surface about an axis parallel to said second axis comprises:
   a clamp having a cylindrical cavity with a central axis formed therein, said clamp secured to said support member, said central axis of said cylindrical cavity extending in a direction perpendicular to the cavity of said bracket;
   a cylindrical tube inserted into said cylindrical cavity of said clamp, one end of said tube being secured to said work surface;

wherein said tube is rotatable within said cylindrical cavity for positioning said work surface in a selected position, said clamp being fastenable to secure said table in said selected position.

35. A multiple-axis machining apparatus, comprising:

a first table forming a horizontally disposed upper surface and having an opening for mounting a first tool in an inverted position therein and for projecting a first bit upward through said opening and above said upper surface, wherein said horizontal upper surface has first and second axes intersecting each other in perpendicular relationship and said opening is centered on a vertical third axis, intersecting said first and second axes in perpendicular relationship therewith;

fence means for guiding movements of a workpiece along said upper surface of said first table and for positioning said workpiece in relation to said first bit;

a second table assembly attachable to said first table;

carriage means for moving a second tool in a direction parallel to said first axis, said second tool having a second bit oriented in a downward position parallel to said third axis;

positioner means for variably moving said carriage means in a direction parallel to said second axis and for variably moving said fence means in a direction parallel to said second axis in relation to said upper surface of said first table in a precise and repeatable manner; and means for rotating said second table in three dimensions.

36. The multiple-axis machining apparatus of claim 35, wherein said first table includes attachment means for securing an item to said upper surface.

* * * * *

UNITED STATES PATENT AND TRADEMARK OFFICE
CERTIFICATE OF CORRECTION

PATENT NO. : 5,647,707
DATED : July 15, 1997
INVENTOR(S) : Jean-Paul Poulin

It is certified that error appears in the above-identified patent and that said Letters Patent is hereby corrected as shown below:

In column 14, line 50, "Said" should read -- said --.

Signed and Sealed this

Twenty-third Day of June, 1998

Attest:

BRUCE LEHMAN

Attesting Officer

Commissioner of Patents and Trademarks